(12) United States Patent
Børseth et al.

(10) Patent No.: US 11,701,613 B2
(45) Date of Patent: Jul. 18, 2023

(54) CARBON CAPTURE SYSTEM COMPRISING A GAS TURBINE

(71) Applicants: KARBON CCS LTD, Valletta (MT); Knut Børseth, Tårnåsen (NO); Henrik Fleischer, Oslo (NO)

(72) Inventors: Knut Børseth, Tårnåsen (NO); Henrik Fleischer, Oslo (NO)

(73) Assignee: KARBON CCS LTD, Valletta (MT)

( * ) Notice: Subject to any disclaimer, the term of this patent is extended or adjusted under 35 U.S.C. 154(b) by 104 days.

(21) Appl. No.: 16/979,391

(22) PCT Filed: Mar. 9, 2018

(86) PCT No.: PCT/NO2018/050068
§ 371 (c)(1),
(2) Date: Sep. 9, 2020

(87) PCT Pub. No.: WO2019/172772
PCT Pub. Date: Sep. 12, 2019

(65) Prior Publication Data
US 2021/0060478 A1 Mar. 4, 2021

(51) Int. Cl.
*B01D 53/14* (2006.01)
*B01D 53/00* (2006.01)

(52) U.S. Cl.
CPC ....... *B01D 53/1475* (2013.01); *B01D 53/002* (2013.01); *B01D 2251/306* (2013.01);
(Continued)

(58) Field of Classification Search
CPC .............. B01D 53/1475; B01D 53/002; B01D 2251/306; B01D 2251/606; B01D 2257/50; B01D 2258/0283; F23J 2215/50
(Continued)

(56) References Cited

U.S. PATENT DOCUMENTS 6,655,150 B1    12/2003  Asen et al.
2007/0006565 A1  1/2007  Fleischer et al.
(Continued)

FOREIGN PATENT DOCUMENTS

KR    1020100060868       6/2010
WO       2011129707 A1   10/2011
WO       2017042163 A1    3/2017

OTHER PUBLICATIONS

International Search Report and Written Opinion dated Nov. 2, 2018 (PCT/NO2018/050068).
(Continued)

*Primary Examiner* — Anita Nassiri-Motlagh
(74) *Attorney, Agent, or Firm* — Alix, Yale & Ristas, LLP

(57) ABSTRACT

A method and a plant for capturing CO2 from an incoming flue gas. The flue gas can be exhaust gas from coal and gas fired power plants, cement factories or refineries. The incoming exhaust gas is cooled, mixed with air and compressed, and thereafter introduced into a combustion chamber together with gas and/or liquid fuel. Part of the combustion is achieved by separate burners with cooling/combustion air feed with a volume equal to the volume of CO2 captured. Said burners will elevate the temperature in the combustion chamber allowing combustion of exhaust gas with low oxygen content. CO2 is captured at high partial pressure before expansion by the gas turbine to produce power and generate steam in the heat recovery unit. The gas turbine will operate with high efficiency close to design parameters with respect to inlet temperature, pressure and flow.

23 Claims, 16 Drawing Sheets

First part of flow diagram with temperatures of the flue gas. A filter upstream of compressor (2) is a standard unit for the turbine (1). A mixing unit is arranged upstream the Filter. Feed to the mixing unit; Flue Gas (6) and supplementary Air (27) controlled by the Fan (8) driven by the Electric Motor (7). Main challenge; design of the High Temperature Heat Exchanger (25) with an inlet temperature of 1100 dgC.

(52) U.S. Cl.
CPC .... *B01D 2251/606* (2013.01); *B01D 2257/50* (2013.01); *B01D 2258/0283* (2013.01); *F23J 2215/50* (2013.01)

(58) Field of Classification Search
USPC ........................................................ 423/220
See application file for complete search history.

(56) References Cited

U.S. PATENT DOCUMENTS

| | | |
|---|---|---|
| 2008/0104958 A1 | 5/2008 | Finkenrath et al. |
| 2012/0143474 A1 | 6/2012 | Lee |
| 2015/0360175 A1* | 12/2015 | Ma ..................... B01D 53/8631 422/171 |
| 2017/0009652 A1 | 1/2017 | Sundaram et al. |

OTHER PUBLICATIONS

International Preliminary Report on Patentability dated Jul. 9, 2020 (PCT/NO2018/050068).
Machine English translation of Chinese First Office Action dated Dec. 30, 2021 for Chinese Patent Application No. 201880093225.2.
Indian Examination Report dated Mar. 28, 2022 for Indian Patent Application No. 202017043480.
Korean Office Action dated Jun. 17, 2022 with English translation for Korean Patent Application No. 10-2020-7028969.

* cited by examiner

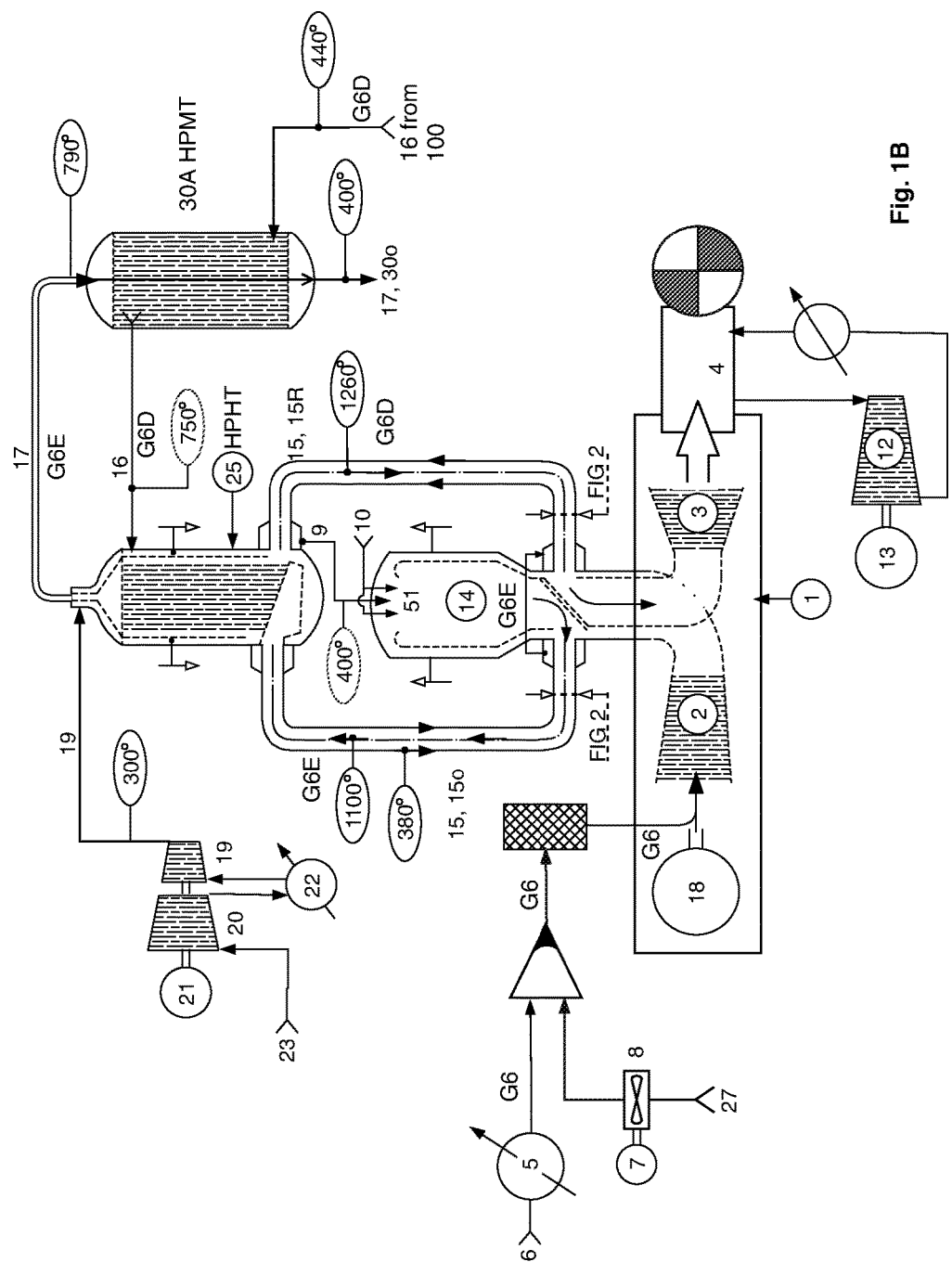

Fig. 1B: First part of flow diagram with temperatures of the flue gas. A filter upstream of compressor (2) is a standard unit for the turbine (1). A mixing unit is arranged upstream the Filter. Feed to the mixing unit; Flue Gas (6) and supplementary Air (27) controlled by the Fan (8) driven by the Electric Motor (7). Main challenge; design of the High Temperature Heat Exchanger (25) with an inlet temperature of 1100 dgC.

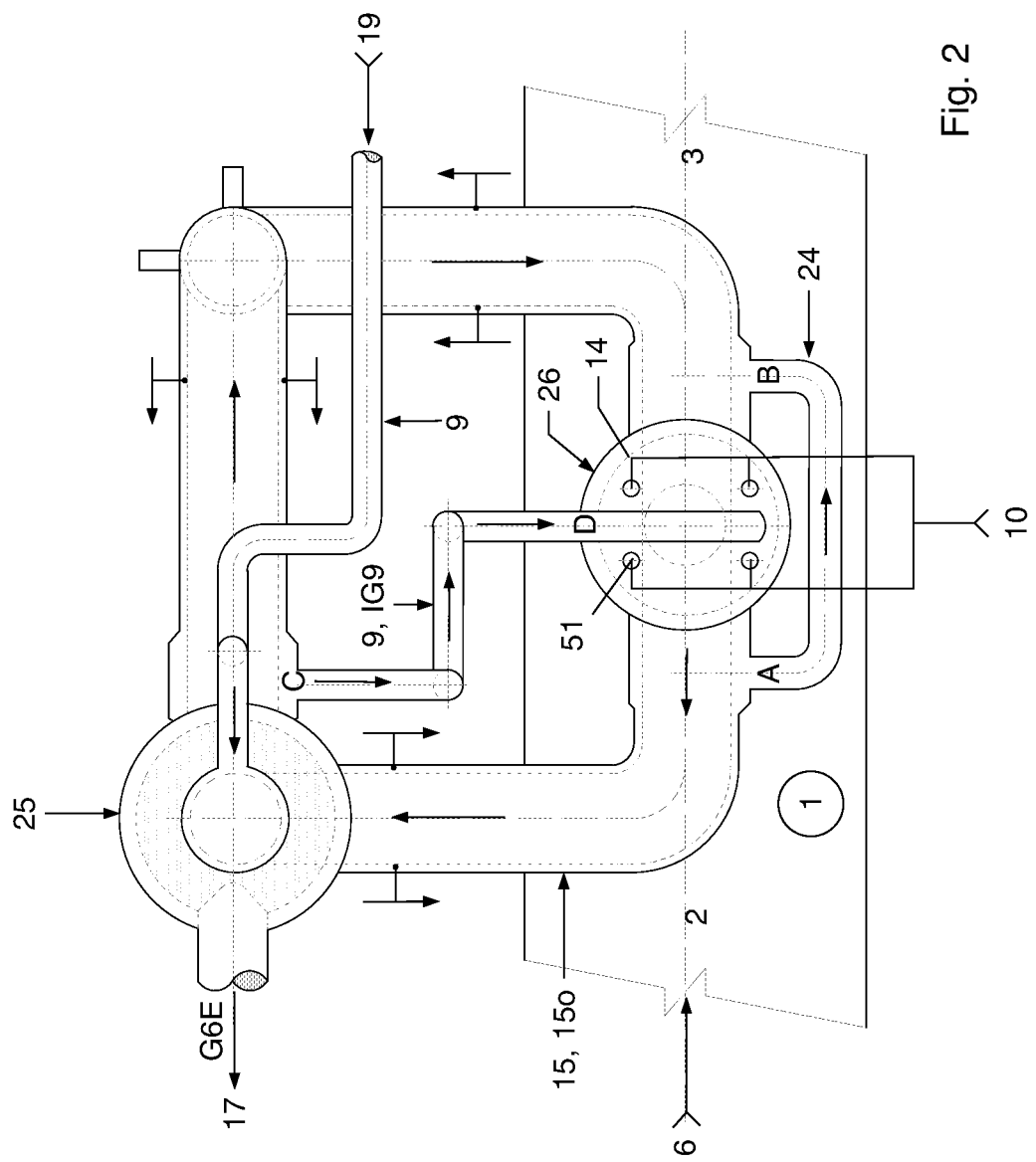

Fig. 5 flow diagramme

Fig. 7 gas-balance (thickness illustrate relation, but not unscaled)

CARBON CAPTURE SYSTEM COMPRISING A GAS TURBINE

FIELD OF THE INVENTION

The present invention relates to the field of Carbon Capture technology and directed to a thermal power plant or a heat generating plant where flue gas from the thermal power or heat generating plant is directed to a gas turbine with a large external combustion chamber is designed to further burn the $CO_2$ rich flue gas with low Oxygen content, and extracting $CO_2$ from the resulting $CO_2$-enriched flue gas in an integrated carbon capture plant operating under high partial pressure.

Background Art and Problems Related Thereto

The largest market for $CO_2$ capture is from flue gas from existing coal fired power plants. Countries with large coal reserves could continue to utilize its resources utilizing so-called "Clean Coal Technology".

International patent application publication WO0048709 relates to a method for $CO_2$ capture wherein the exhaust gas from a gas turbine is re-pressurized to improve the efficiency of the absorption, and to reduce the volume of the gas to be treated. The use of pressurizing absorption or membranes for separation of $CO_2$ from the exhaust gas have also been suggested. In its abstract it is described that the publication relates to a method for removing and recovering $CO_2$ from exhaust gas, wherein the exhaust comes from a power plant and/or a heat generating plant. The removal of $CO_2$ form the exhaust gas is made by chemical absorption and following desorption, where the exhaust gas is fed to an absorber using a chemical absorbent wherein the $CO_2$ is absorbed, and a $CO_2$-depleted exhaust gas stream is formed. The $CO_2$ rich absorbent is further fed to a desorber (stripper) wherein $CO_2$ is removed from the absorbent, and the absorbent then generally free of $CO_2$ being recirculated to the absorber, while the desorbed $CO_2$ gas is discharged.

International patent application publication WO2017/042163, Capsol-Eop AS of Norway, describes a method and plant for $CO_2$ capture. More specifically, it describes a method and plant for capturing $CO_2$ from a $CO_2$ containing exhaust gas (1), where the exhaust gas is compressed (10) and thereafter cooled (13, 15, 22) before the exhaust gas is introduced into an absorber (30), wherein the exhaust gas is brought in counter-current flow with an aqueous $CO_2$ absorbent solution (49), to give a lean exhaust gas (31) that is withdrawn from the absorber (30), reheated (22, 13) against incoming compressed exhaust gas, and thereafter expanded (34) and released into the atmosphere (4), where the aqueous $CO_2$ absorbent solution is an aqueous potassium carbonate solution, and that the steam and $CO_2$ withdrawn from the regenerator (40) is cooled in a direct contact cooler (61) by counter-current flow of cooling water (62), to generate a gaseous flow (70) of cooled $CO_2$ and steam that is withdrawn for compression and drying of the $CO_2$, and a liquid flow (64) of cooling water and condensed steam that is withdrawn and flashed (80), to give a cooled liquid phase (84) that is recycled as cooling water for the direct contact cooler (61) for the withdrawn $CO_2$ and steam, and a gaseous phase (81) that is compressed (82) and thus heated, and introduced into the regenerator (40) as stripping steam (83).

US20070006565, Sargas AS, Norway, "Purification works for thermal power plant" describes a method for separation of $CO_2$ from the combustion gas from a thermal power plant fired with fossil fuel, wherein the combustion gas from the thermal power plant is used as cooled and compressed. After compression, it is reheated by combustion of natural gas in a combustion chamber to form an exhaust gas. The exhaust gas is cooled and brought in contact with an absorbent absorbing $CO_2$ from the exhaust gas to form a low $CO_2$ stream and an absorbent with absorbed $CO_2$, and where the low $CO_2$ stream is heated by means of heat exchanges against the hot exhaust gas leaving the combustion chamber before it is expanded in turbines, is described. A plant for performing the method and a combined plant is also described.

Efficient $CO_2$ capture should be based on abatement under low Oxygen content and high partial pressure of $CO_2$ using absorbents with no harmful emissions. An advantageous absorbent is Hot Potassium Carbonate, $K_2CO_3$.

A known process for such $CO_2$ capture is the so-called Benfield Process.

The use of Potassium Carbonate as absorbent under atmospheric pressure is not feasible for $CO_2$ capture low selectivity.

An example of a power plant is the Vartan coal fired power plant, Stockholm. The coal fired power plant generates 2×100 MW, and has the following characteristics:

| Type | pressurized fluid bed combustion (PFBC) |
|---|---|
| PFBC description | Coal pressurized boiler shell cooled with combustion air (abt. 350 dg C.) Power generated by steam cycle abt. 80% Power generated by gas turbine (GT35P with intercooling) abt.; 20% Steam turbines operate with an efficiency of abt. 36% |

In the Sargas patent application; $CO_2$ is captured at high pressure prior to expansion, both for gas and coal fired power and thermal plants.

The following are Examples of Sargas reference projects with $CO_2$ capture;
A. Gas fired power plant 100 MW, Hammerfest (Efficiency abt.; 38%)
B. Coal fired power plant 4×100 MW, Husnes (Efficiency abt.; 36%)
C. Gas fired power 250 MW, IKM More (Type Stargate 250) cooperation with General Electric, using a GE modified gas turbine LMS100. (Efficiency abt. 41%). The power generated by gas turbine and steam turbine each is about. 50%

Kebmar AS has a patent application published as NO20140540 for a new gas fired power plant with $CO_2$ capture, wherein two of Alstom GT11N2 are arranged in "tandem", abbreviated "GTCC". Flue gas is fed from the first gas turbine with cooled, and thereafter introduced to the air intake of the second gas turbine which is arranged with $CO_2$ and NOx capture. The efficiency is about 46%.

General Background of the Invention; Motivation

Long-term climate risks with regard to an increasing man-made $CO_2$-level in the atmosphere, with the potential of incurring severe and irreversible global climate changes having many predictable and several unforeseen negative consequences, are catalyzing the adoption of clean technologies. Most countries plan to cut coal burn, which is responsible for almost half of global $CO_2$ emissions, to meet their promises made in the Paris agreement. Significant pressure is building on fossil fuels, 'dirty' coal especially.

Developing clean $CO_2$-reduced technology is a priority everywhere. In recent years the World has advanced significantly in renewable energies. However, little or no progress was made in 'clean' $CO_2$-reduced fossil fuels, as $CO_2$ capture technology has not become industrial yet. The energy-consuming utilities have their attention elsewhere, they undergo large transformations, implementing electric vehicles use and the required reshaping of infrastructure into de-centralized electricity supply. Unlike when renewables started, government's willingness to offer generous subsidies for 'new', CO2-reduced fossil energy technology, is uncertain or in decline.

The deployment of carbon capture and storage ('CCS') technologies is still the Black Swan of the energy world; a low probability, high impact measure: If coal fired power plants were fitted with CCS technology, global CO2 emissions would drop drastically; by 8-19% by 2030 and 23-25% by 2100. It would be the single largest climate measure in the world. While next-generation technical solutions already exist for CO2-emission-free coal and gas power, they are mostly intricate and technically immature, expensive, and thus not viable.

This is the case for parts of the prior art to this patent application, some of which bear the names of the Applicants as inventors. The present inventors/applicants have for years focused on Driving down prohibitively high CCS costs: Today's solutions are not sufficiently inexpensive for the World to afford them. To be deployable, technology cannot rely on subsidies but be economically sustainable.

A solution that works for significantly reducing the CO2-emissions from coal and gas-based energy production, cement production, and refinery emission of flue gases.

The avoidance of newly invented industrial components, lacking industrial support: To become a mass product, plants with CO2-reduced emissions must use well known components and systems, such that industry is willing to stand behind them, with vendors performance guarantees.

Plants that are robust, have minimal footprint and use absorbents with no toxic side-effects at all, with minimal degradation as well as minimal energy spent on CO2-capture.

Coal is inexpensive energy in abundance, its supply is everywhere on all continents. Gas has a lower emission level than coal. Paradoxically, once coal and gas exhaust are stripped of CO2-emissions, these fuels will remain part of tomorrow's energy source mix. However, focus must be on CO2-capture at acceptable costs, only then can CCS become implemented. CO2 mixed with Hydrogen into Methanol is an example of a way to create new raw materials and value chains. Methanol, synthetic fuels and materials can be produced from CO2 and used for vehicles on land and at sea, without the need for expensive pipelines which are cumbersome from a regulatory viewpoint and requiring lengthy build processes. CO2 captured must be ultra-clean, as only ultra-clean CO2 streams allows its recycling into enhanced oil recovery (EOR) or methanol for forming new synthetic materials. New industry and jobs in this field would be welcome in old coal, gas and oil countries.

The present inventors/applicants predict that once coal and gas CO2-emissions' removal has become viable, it will bring about new feasible industry. This will lower the costs even further and allow a widely distributed, realistic and affordable use of fossil fuels. The latter is vital for the developing world. Affordable cost of capture will accelerate the revolution of the energy ecosystem, with fossil fuels staying in the energy mix, alongside renewable energy sources. The present patent application attempts to contribute a solution to that problem.

ON THE PRESENT INVENTION

According to an embodiment of the present invention, we describe CO2 capture from flue gas from a source such as a coal fired power plant. The flue gas from the plant is cooled and thereafter mixed with air in order to achieve a combustible flue gas with an Oxygen content above 8%, based on a pressure of 15 Bar. The gas turbine is described to operate close to design conditions with respect to turbine flue gas inlet temperature (TIT), pressure and flow, but the gas turbine external, "silo-type" combustion chamber redesigned as follows; a flue gas outlet is arranged at the bottom of the combustion chamber leading to a high temperature heat exchanger (HTHE). A return inlet for CO2-depleted flue gas to the turbine's expander is arranged integrated with the bottom of the combustion chamber, with feed from the high pressure high temperature heat exchanger (HTHE) back to the expander portion of the gas turbine. Gas burners are arranged at the top, and liquid burners below in the combustion chamber. In an embodiment of the invention about 25% of the gas burners are mixed air burners. In an embodiment the air feed is compressed cooling air from a separate compressor, preferably with intercooler. In an embodiment of the invention, about 75% of the gas burners are unchanged from the original gas burners of the combustion chamber. In an advantageous embodiment of the invention, air is used for cooling of the shell of the High Temperature Heat Exchanger and the co-axial pipes to and from said Heat Exchanger. In an embodiment of the invention, the amount of air added to the combustion chamber is corresponds to the added volume of CO2 captured. In an embodiment of the invention the absorber will operate at a pressure of about 15 Bar, with high partial pressure of CO2.

A reference to a background art process is the so-called Sargas Stargate 250 power plant, wherein the absorber will operate will operate at a pressure of about 8 Bar. In the Stargate 250, the inlet flue gas inlet temperature to the expander is about 700 degrees C., governed by a conventional heat exchanger design. A disadvantage of that heat exchanger is that there is no shell cooling of the heat exchanger. The Stargate 250 plant has a design flue gas inlet temperature of 850 degrees C. Some consequences of the design of Stargate 250 is that it has reduced efficiency for the expander portion of the turbine. A further disadvantage is that the efficiency of the CO2 capture island is reduced due to the relatively low absorption pressure. Further, the cost of the CO2 capture island is high due to the low absorption pressure, because the absorber and desorber of the CO2 capture plant must have a much larger cross-section compared to a plant wherein the pressure is e.g. 15 Bar or higher.

SHORT SUMMARY OF THE PRESENT INVENTION

A main object of the present invention is to disclose a CO2 capture system with a gas turbine (1) comprising the following features:

an inlet line (6) for a CO2-containing initial flue gas flow (G6) to a compressor portion (2) of said gas turbine (1) for compressing said CO2-containing flue gas flow (G6)

said compressor portion (2) having an outlet passage (1*o*) for compressed flue gas (G6), to a high-pressure combustion unit (26) with a HP combustion chamber (14) for said compressed flue gas (G6), said HP combustion chamber (14) provided with fuel burners (51) arranged for burning remaining oxygen in said compressed flue gas (G6) with a mixture of compressed air (IG9) supplied via a combustion and cooling air pipe (9) and at least a fuel feed line (10), said HP combustion unit (26) with said combustion chamber (14) provided with an exit CO2-enriched flue pipe (15o) for hot, HPHT, afterburned CO2-enriched flue gas (G6E) to a high pressure high temperature (HPHT) gas/gas heat exchanger (25), further delivering said CO2-rich flue gas (G6E) via a HPMT gas line (17) to a high pressure low temperature (HPLT) heat exchanger (30) having an outlet line (30o) for said CO2-rich flue gas (G6E), to a high pressure CO2 capture plant (100), said CO2-capture plant (100) comprising:

a HP gas return line (16) for high pressure CO2-depleted flue gas (G6D), and an outlet line (100o) for export of captured CO2, said HP return line (16) returning said HP CO2-depleted flue gas (G6D) back to said HPHT gas/gas heat exchanger (25) for heating said HP CO2-depleted flue gas (G6D), and further connected to a flue gas return pipe (15r) delivering said heated HP CO2-depleted flue gas (G6D) to a return passage (1r) to said expander portion (3) of said gas turbine (1).

In an embodiment of the invention, said HP combustion unit (26) with said combustion chamber (14) is provided with an exit co-axial cooled pipe (15, 15R) for feeding CO2-enriched flue gas (G6E) to the bottom of the high pressure high temperature heat exchanger (25), please see FIG. 1B, FIG. 1C, FIG. 3, FIG. 3A-1, FIG. 3A-2.

In an embodiment of the invention, cooling of the shell (925) of said high pressure high temperature heat exchanger (25) is performed with the compressed air (IG9) delivered by a compressor (19) and pipe (10) to the top of the heat exchanger (25), followed by cooling by the same compressed air (IG9) of the shell (915o) of the co-axial pipe (15, 15o) from the heat exchanger (25) to an adapter (54) between the turbine's (1) casing/co-axial outgoing pipe (15o)/co-axial return pipe (15R) and the combustion chamber (14), a jumper pipe (A-B, 24) around said adapter (54) to an inlet to the co-axial shell (915R) of said return co-axial pipe (15, 15R) cooling said return pipe (15, 15R) carrying said feed of CO2 depleted flue gas (G6D) from the high-pressure high temperature heat exchanger HPHT (25) to the adapter (54) and eventually to the turbine's expander (3).

In an embodiment of the invention, at the end of the co-axial pipe (15, 15R) from the shell (925) of the high-pressure high-temperature heat exchanger (25), this air (IG9) for combustion is delivered to the top of the Combustion Camber (14) by pipeline (9, D).

In an embodiment of the invention the high pressure high temperature CO2 depleted flue gas (G6D) is delivered from the bottom of the high temperature heat exchanger (25) by a this co-axial cooled pipe (15, 15R) to the adapter (54) at the lower part of the combustion chamber (14) and is led by a directional vane (55) feeding the CO2-depleted flue gas (G6D) to the expander (3) of the turbine (1), please see FIG. 3A-3.

In an embodiment of the invention the exit pipe (17) feeds the partly cooled CO2-enriched flue gas (G6E) from the high pressure high temperature heat exchanger (25) to a high pressure medium temperature HPMT Heat Exchanger (30), and out to CO2-capture plant (100). Return flow of C2-depleted flue gas (G6D) via said HPMT heat exchanger (30) is delivered to the High Temperature Heat Exchanger (25) by a return depleted flue gas (G6D) pipeline (16).

Further embodiments of the invention are defined in the attached claims.

The present invention solves several of the disadvantages of the background art mentioned.

Advantages of the Invention

According to the invention the flue gas afterburner combustion unit (26)/combustion chamber (14) operates at high pressure and high temperature HPHT, thus making a generally lower footprint of the combined turbine and carbon capture plant compared to a turbine with a low-pressure carbon capture plant.

Combustion of the flue gas under high pressure, HPHT with efficient mixing and long reaction time burns rest Oxygen more efficiently compared with small combustion chambers operating with short reaction/mixing time Combustion of fuels under high temperature burns "anything", any fuel, including supplementary fuel other than natural gas, far more efficiently than a corresponding lower temperature combustion of fuel in an afterburner.

The high temperature and high pressure HPHT combustion produces enriched CO2 contents in the resulting afterburned CO2-enriched flue gas.

High partial pressure HP of the CO2 gas in the CO2-absorber (33) increases the CO2-absorption to absorption medium significantly, and particularly to Potassium Carbonate K2CO3. In an embodiment of the invention the pressure generated by the compressor (2) is about 15 Bar and this pressure is maintained throughout the circulation of the flue gas with little pressure drop through the entire cycle from the compressor (2) out to the combustion chamber (14), the HPHT heat exchanger (25), the high pressure medium temperature heat exchanger (30A), via the HPMT pipe (17) trough high pressure medium temperature (HPMT) heat exchanger (30A), to the Selective Catalytic Reduction (SCR) (29), through the high pressure Low Temperature (HPLT) Heat Exchanger (30 B), Condenser (31), Absorber (33), of the carbon capture plant (100) and back trough Re-humidifier (32), to the Low Temperature Heat Exchanger (30 B), Medium Temperature Heat Exchanger (30A), and back through the CO2-depleted flue gas return pipe (16), back to the HPHT heat exchanger (25), and back to the turbine's (1) expander (3). The high pressure throughout the loop reduces the required volume of several components such as the very expensive absorber (33) and the stripper (38), to about $\frac{1}{15}$ compared to a low pressure LP carbon capture plant operating at atmospheric pressure.

In an embodiment of the invention the CO2-enriched flue gas (G6E) runs from pipe (17) to high pressure medium/low temperature heat exchanger (30A, 30B), preferably via a selective catalytic reduction unit (29) with liquid NH3 feed, to a condenser (30), to an absorber tower (33) preferably run on K2CO3, back to a re-humidifier (32), back to the HPLT and HPMT heat exchangers (30A, 30B), and back through the flue gas inlet (16) to high-pressure high temperature heat exchanger (25).

In an embodiment of the invention, condensed water is pumped from the condenser (31) to a re-humidifier (32). By this arrangement condensation heat is delivered back to the CO2-depleted flue gas (G6D). Additionally, condensation of the flue gas (G6E) will not take place in the absorber (33) with the effect that that water build up in the absorbent fluid is avoided. In order to compensate for the pressure drop in the above described flow of the flue gas (G6E, G6D), an electrically driven fan is arranged upstream the Absorber (33), please see FIG. 4.

In an embodiment of the invention a flue gas fan is arranged upstream the absorber (33) in order to compensate for the relatively small pressure drop in the above described flue gas flow.

An advantage over prior art WO2017/042163 is an absence of a prior art entire water cooling/steam generation circuit including cooling pipes within an afterburner chamber (see its FIG. 1, component (15)) and steam diffusor/steam turbines and return pumps. This makes the present invention to utilize a pure combination of a gas turbine with one or two large silo-type combustion chamber and a high pressure integrated carbon capture plant, which is far more efficient than a divided gas turbine combined with a gas fired boiler and steam turbine generating unit and a carbon capture plant.

FIGURE CAPTIONS

The attached drawing figures illustrate embodiments of the claimed invention.

FIG. 1A illustrates an embodiment of the invention comprising a gas turbine (1) comprising an inlet line (6) for a CO2-containing initial flue gas flow (G6) via a flue gas cooler (5) and further to a compressor portion (2) of said gas turbine (1), and a high pressure combustion unit (26) further connected to a high-temperature high temperature heat exchanger (25), with an indirect return line to an expander (3) of the turbine driving on the same shaft the compressor (2) and an electric generator (18). Further components comprise an outgoing CO2-enriched flue gas pipe (17) to a high pressure medium temperature heat exchanger (30A). The CO2 capture section (100) and the return pipe (16) for CO2-depleted flue gas (G6D) back to the HPHT heat exchanger (25) is not illustrated in FIG. 1A.

FIG. 1B illustrates further details of an embodiment of the invention shown in FIG. 1A.

FIG. 1C, as well as FIG. 1D, is each a perspective overview of an embodiment of the invention illustrating a CO2 capture system with a gas turbine (1) being fed with flue gas flow (6) from an inlet line (6) from a flue gas source (6S). The gas turbine (1) has an external combustion chamber (14) for afterburning the flue gas, the external combustion chamber (14) here mounted vertically on top of the horizontally arranged gas turbine. Instead of returning the afterburned flue gas, which is CO2-enriched, directly to the gas turbine's (1) expander (3), the CO2-enriched flue gas is sent via a gas flow adapter (54) out to a high pressure high temperature counterflow heat exchanger (25) having an outgoing high pressure CO2-enriched flue gas outgoing line (17) to a high pressure medium temperature heat exchanger HPMT (30A) leading further to the carbon capture plant (100), and a corresponding high pressure lower temperature CO2-depleted flue gas return line (16) from the carbon capture plant (100) via the high pressure medium temperature heat exchanger (30A). These two flue gas lines (17, 16) are thus connected to a CO2-capture plant (Please see FIG. 4) arranged for being operated under high pressure.

FIG. 2 shows in a top view further details of an embodiment of the gas turbine illustrated in FIG. 1A and FIG. 1B. This embodiment is asymmetrical with regard to the piping between the combustion unit (26) and the high-temperature high pressure heat exchanger (25).

FIG. 3 corresponds to the embodiment of the invention illustrated in FIG. 2 and illustrates in a lateral part section view, as a rough overview, the combustion unit (26) with the combustion chamber (14) and the HPHT heat exchanger (25). Here is shown the high pressure (HP) gas return line (16) for relatively cooler, high pressure CO2-depleted flue gas (G6D) from the carbon capture plant back to the HPHT heat exchanger (25).

FIG. 3A-1 illustrates an embodiment of the invention. It shows the following:
in the left part of the sheet, a lateral view, part vertical section view of the combustion unit (26) with the combustion chamber (14) and its corresponding coaxial piping (15o, 915o) out and return coaxial piping (15R, 915R).
In the right part of the sheet is a lateral view and vertical section view of the high-pressure high temperature heat exchanger with the corresponding coaxial piping (15o, 915o) out and return coaxial piping (15R, 915R). In this embodiment, these main components are arranged as a symmetrical tank and pipe loop which will deaden the thermal stresses.
In the middle portion of the sheet is a detail of the dividing plate in an inlet/outlet adapter (54).

FIG. 3A-2 corresponds to the generally symmetrical embodiment FIG. 3A-1 and is, in the left part of the sheet, a top view and partial section of the combustion unit (26) with the combustion chamber (14) and its corresponding coaxial piping (15o, 915o) out to the and return coaxial piping (15R, 915R). In the right part of the sheet is an end view and part vertical section view of the high-pressure high temperature heat exchanger with the corresponding coaxial piping (15o, 915o) to the HPHT heat exchanger (25).

Figure 3:
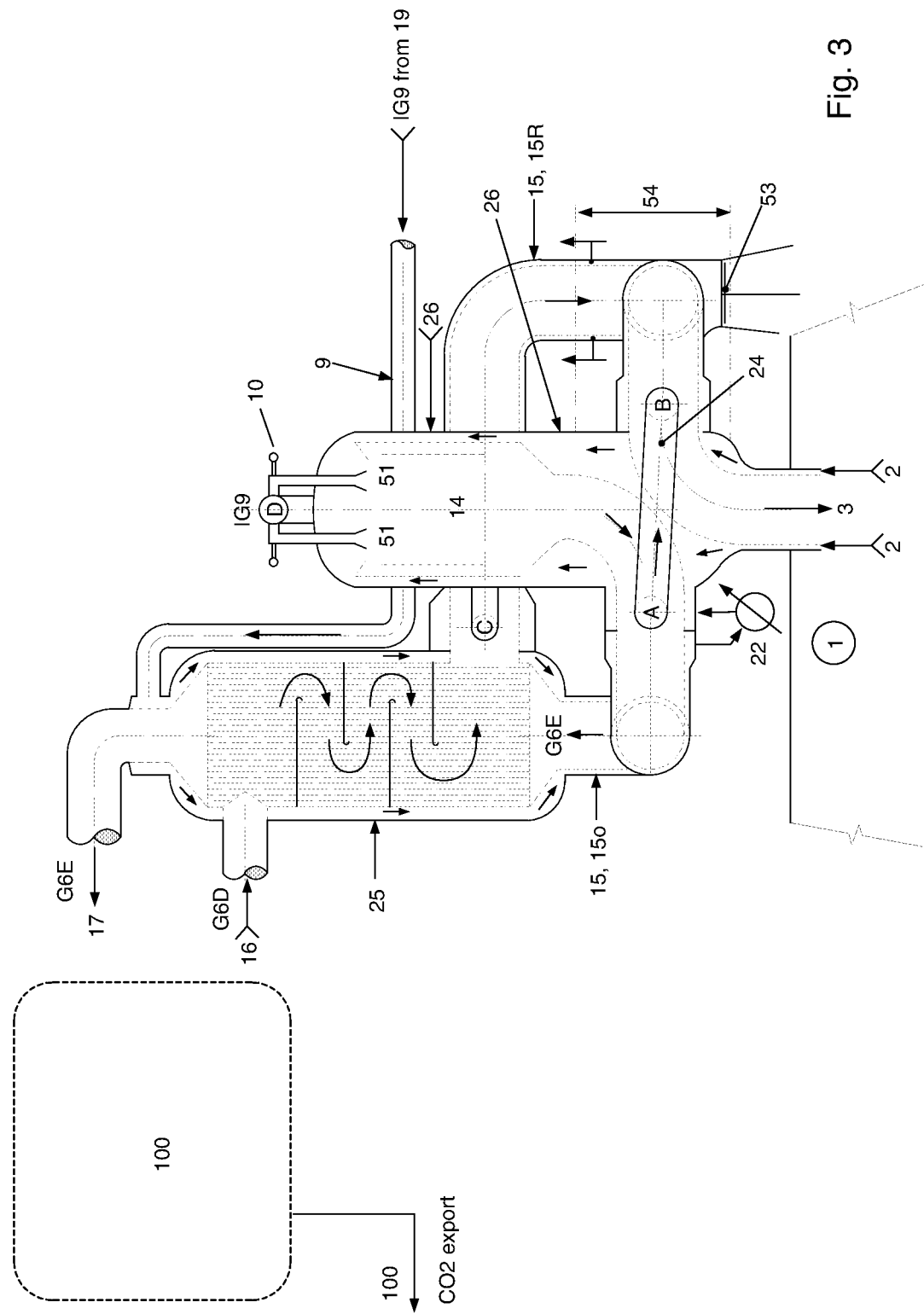
FIG. 3A-3 illustrates further details of the combustion chamber 14.
Figures 1, 3A:
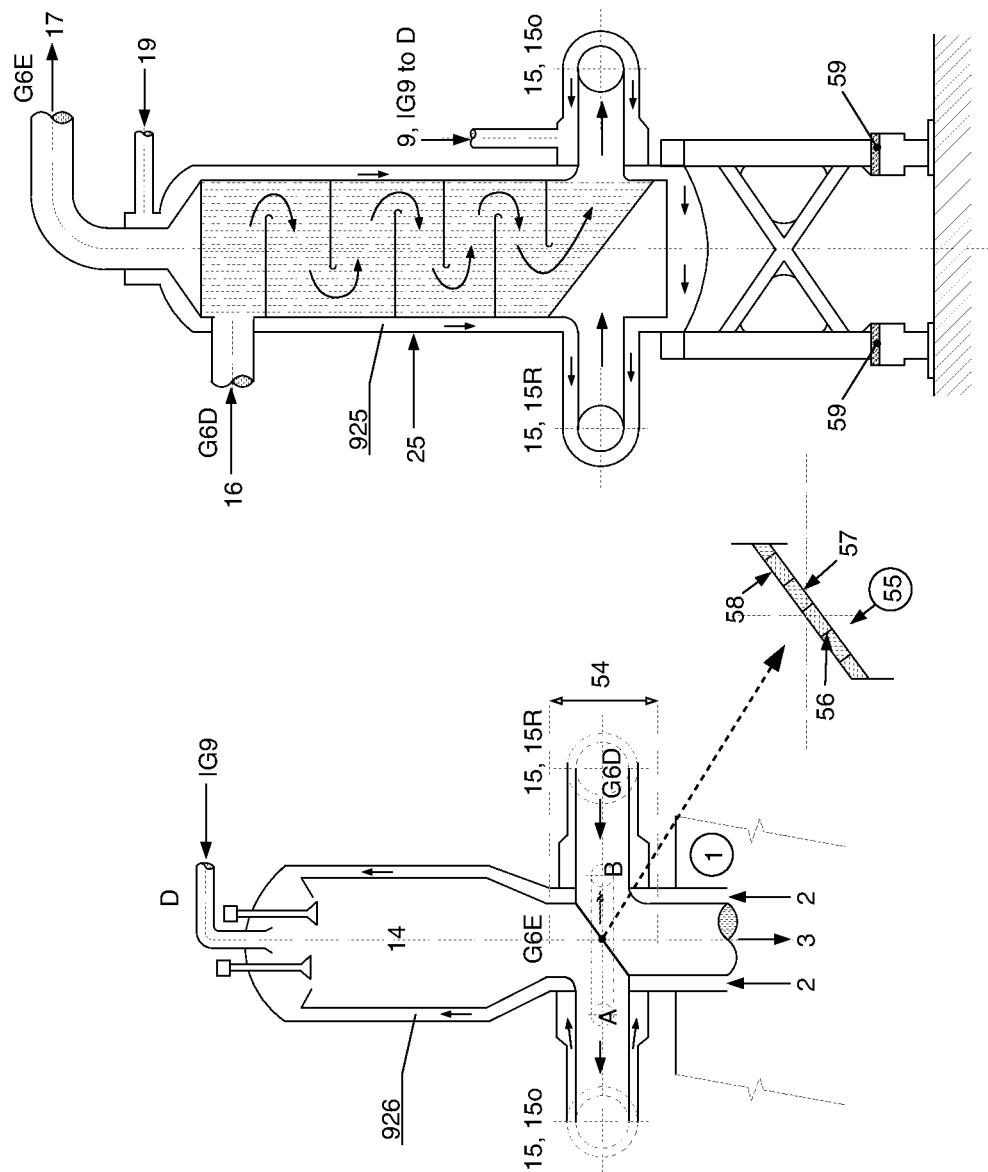
Figures 2, 3A:
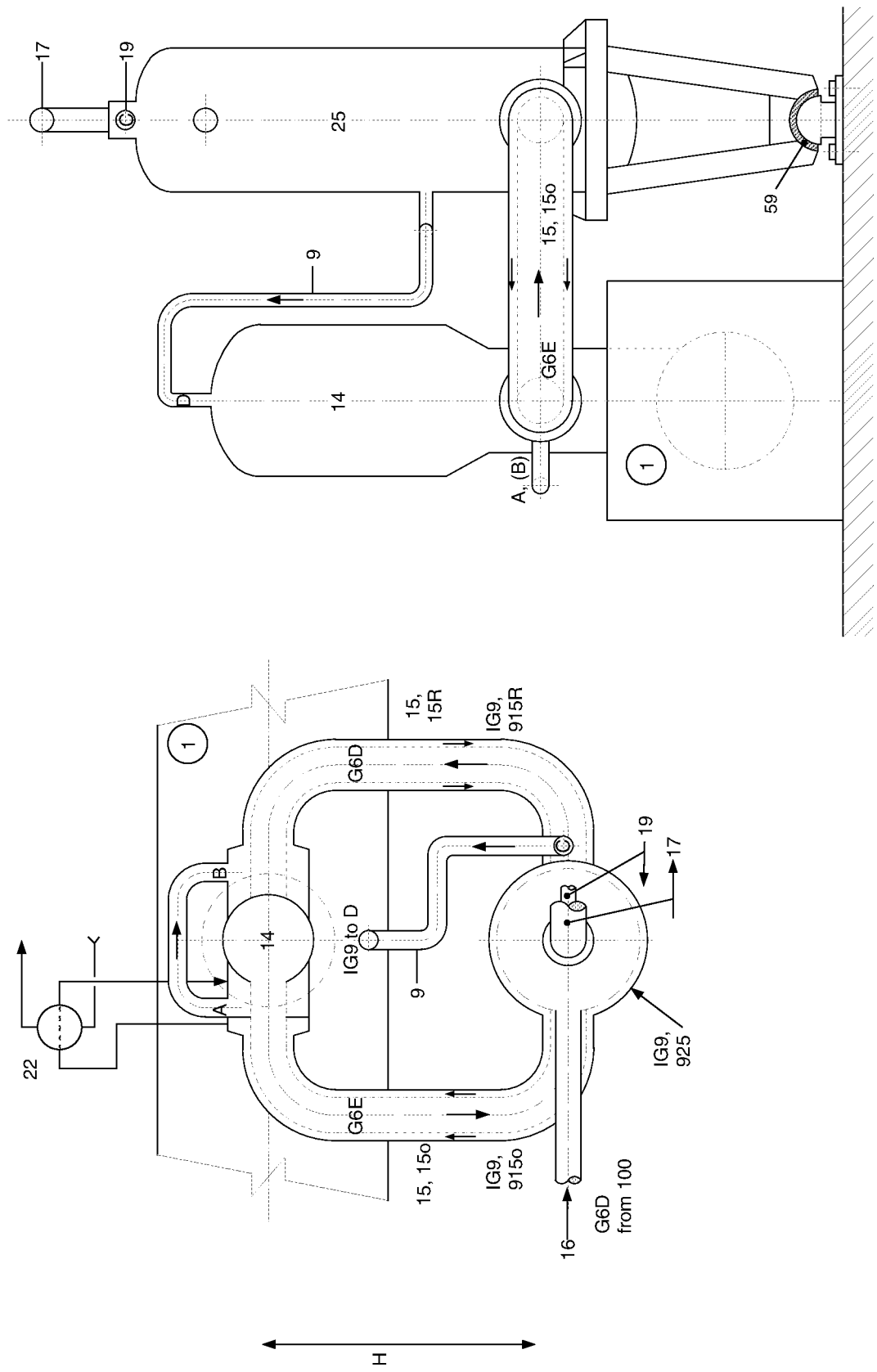
Figures 3, 3A:
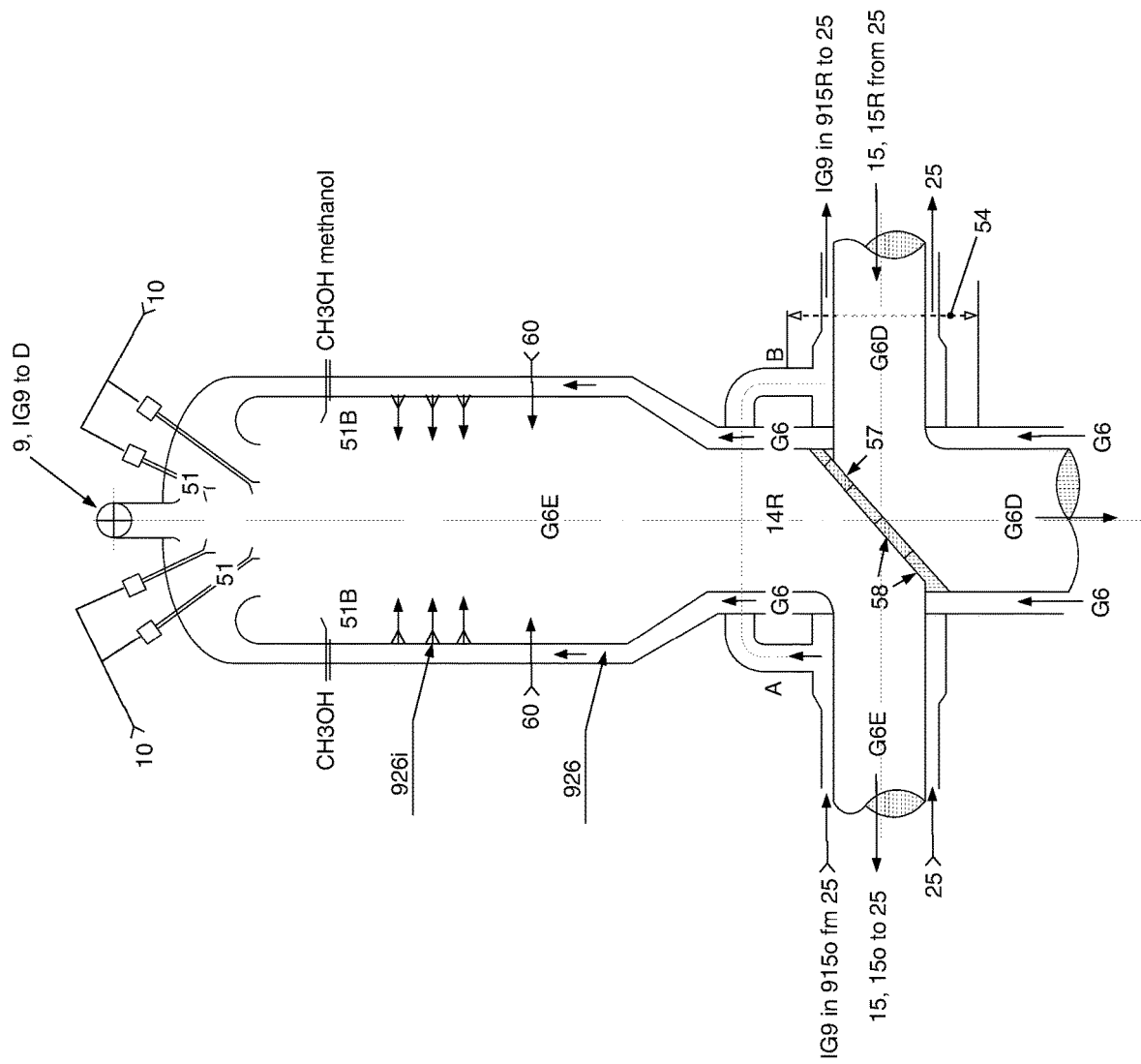
Figure 4:
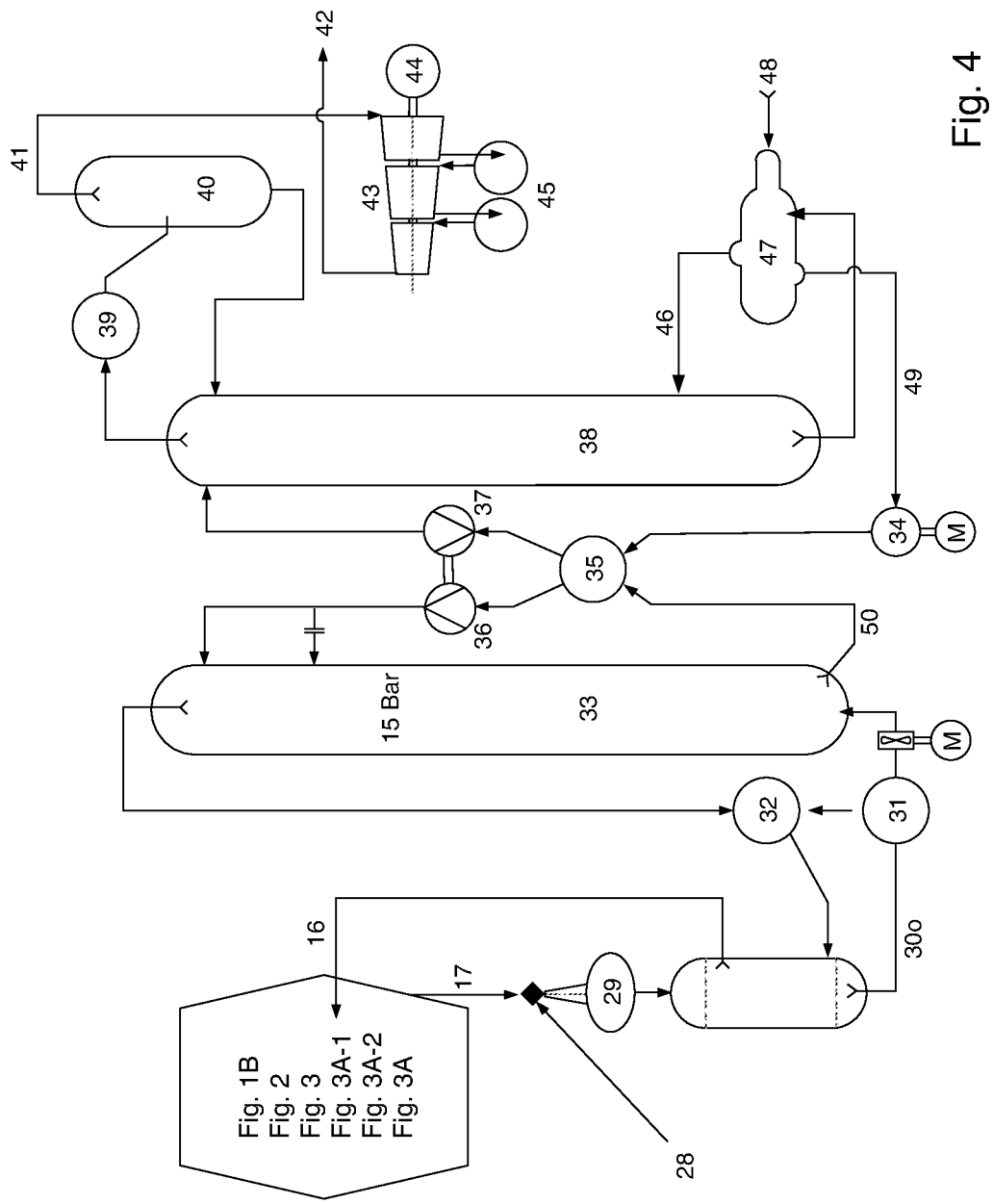

FIG. 4 is an illustration of the carbon capture plant portion of the invention. A "cloud" referring to FIG. 1B, FIG. 2, FIG. 3, FIG. 3A-1, FIG. 3A-2, FIG. 3A, with the supply line (17) of high temperature high pressure HPHT CO2-enriched flue gas (G6E) from the high pressure medium temperature heat exchanger (30A) (FIG. 1B) to the selective catalytic reduction (29) and the high pressure low temperature heat exchanger (30B) at the entry to the carbon capture section (100), and the return line (16) from the high pressure low temperature heat exchanger (30B) for CO2-depleted high pressure, lower temperature flue gas (G6D) back to the high pressure medium temperature heat exchanger (30A) and the high pressure high temperature heat exchanger (25).

Figure 5:
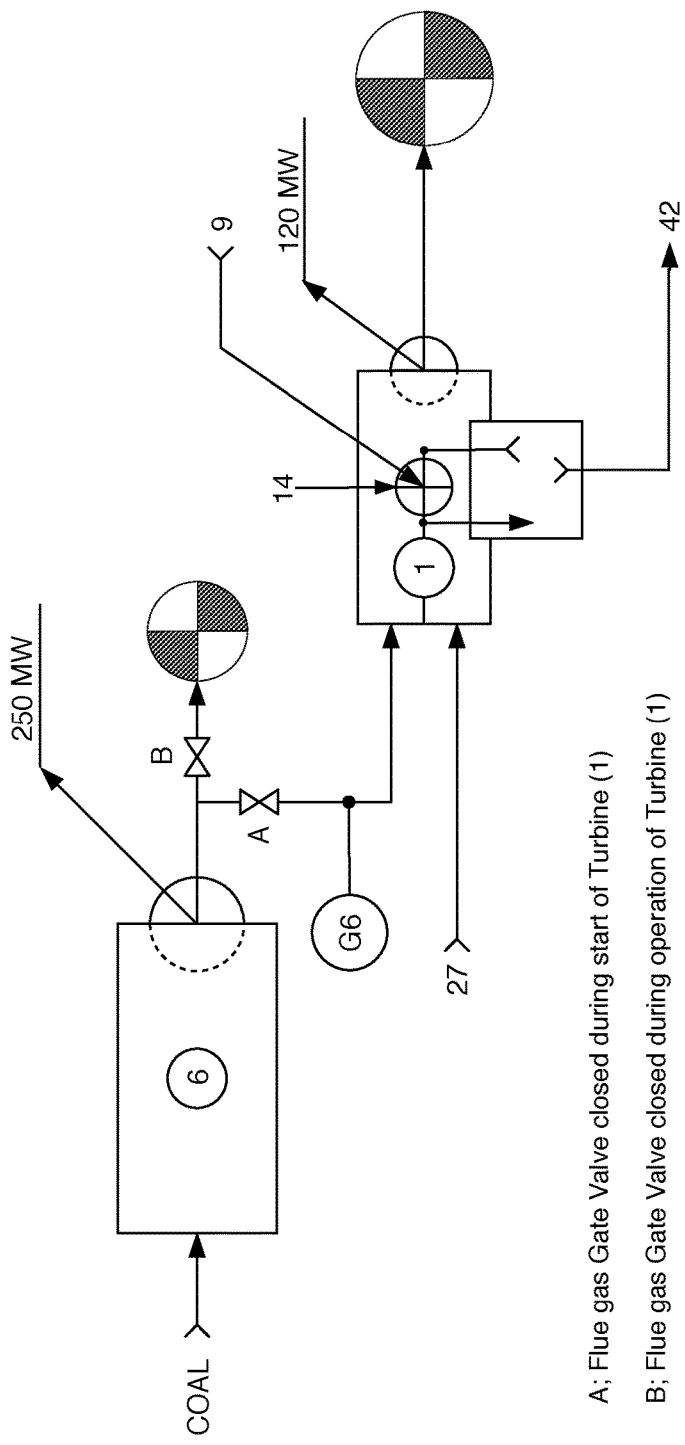

FIG. 5 is a flow diagram for gas and energy in an embodiment of the present invention.

Figure 6:
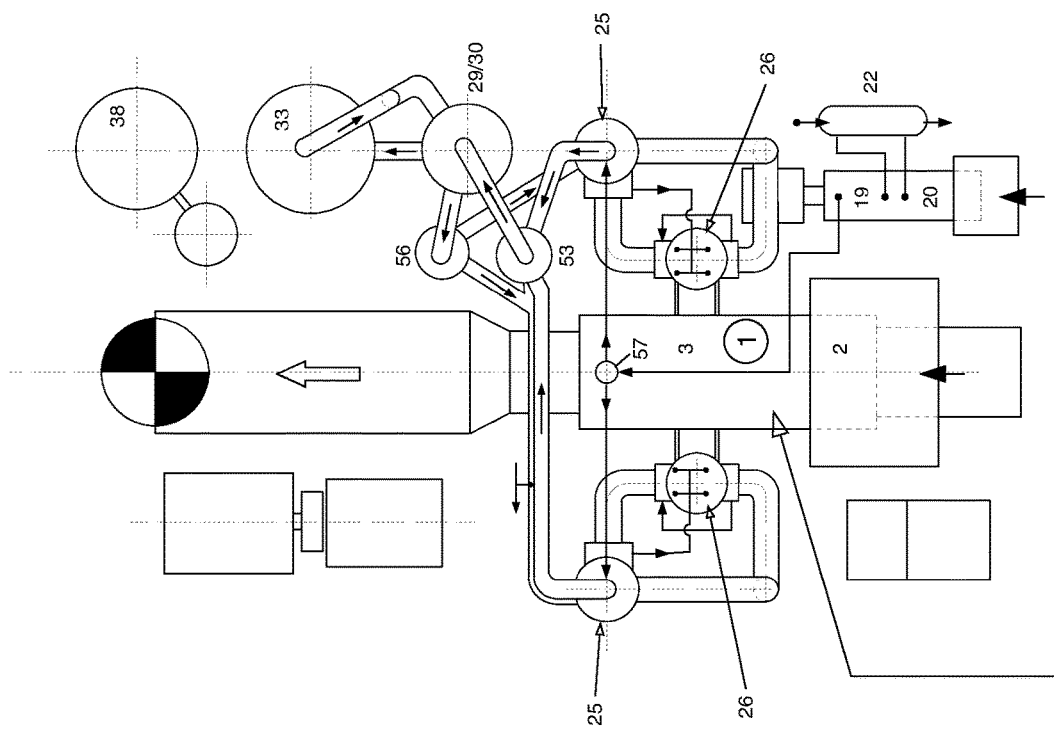

FIG. 6 is an exemplary embodiment of the invention wherein a pair of outlet and inlet (1o, 1R) from the gas turbine (1) is directed to either side of the main body of the gas turbine (1). The inlet and outlet are connected to a pair of combustion unit (26) and high pressure high temperature heat exchanger (25), otherwise arranged as the present invention. This embodiment is advantageous for connecting to e.g. an SGT 2000 gas turbine with two so-called silo combustion units.

Figure 7:
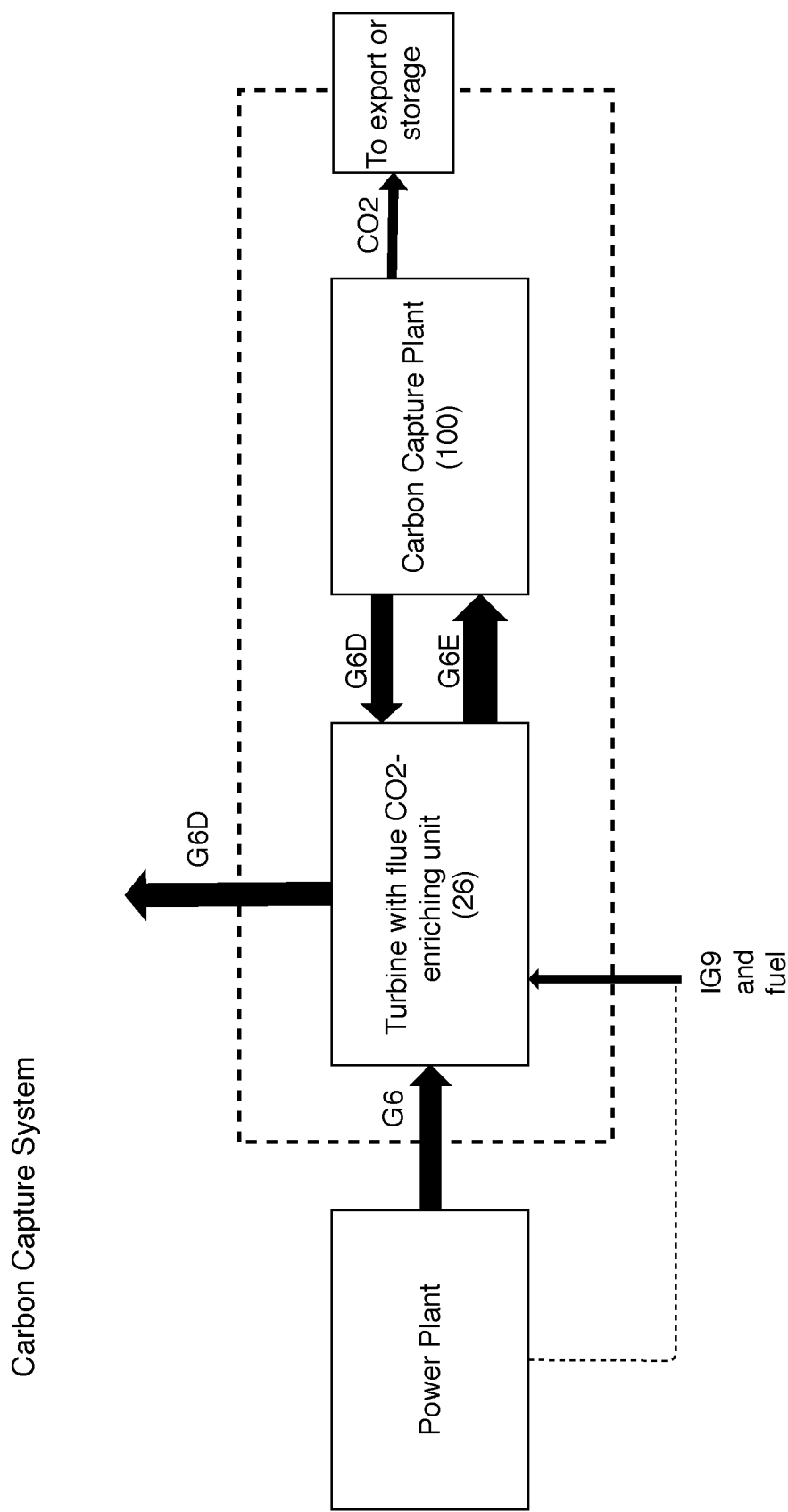

FIG. 7 is a gas balance diagram roughly illustrating incoming and outgoing gas volumes. The width of the arrows are not exactly to scale.

Figure 8:
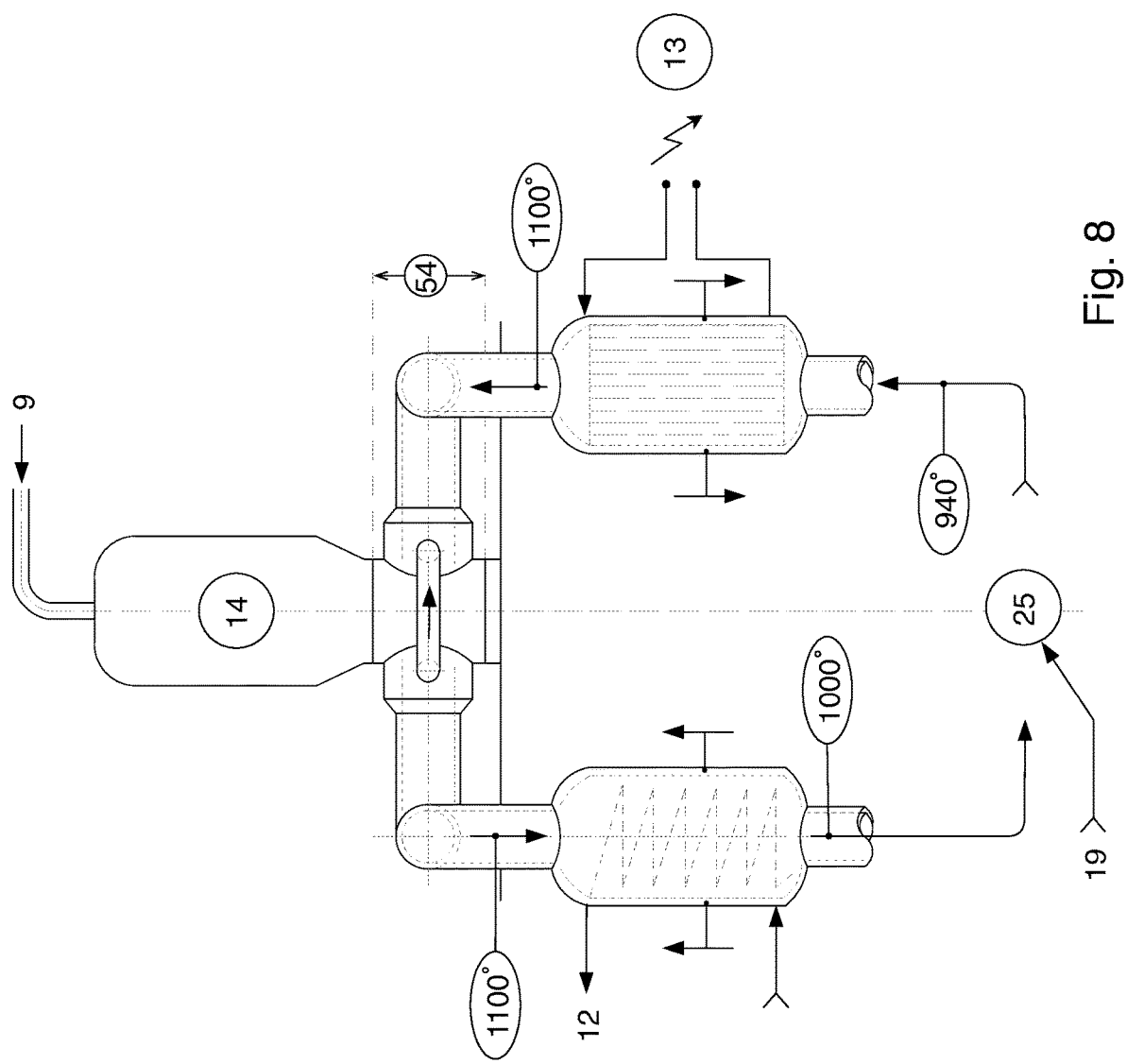

FIG. 8 is an illustration of an embodiment of the invention wherein said combustion unit (26) with said combustion chamber (14) wherein in order to reduce the temperature a heat recovery unit is arranged upstream the HPHT heat exchanger (25), wherein the energy from the HRU (steam) is delivered to a turbine (12); as a consequence the flue gas exit temperature from HPHTI heat exchanger (25) is reduced, in order to achieve design flue gas temperature to the inlet to the expander (3), with an electrical heater is arranged downstream the HPHT heat exchanger (25). Gas burners are not an option to increase the temperature, as the combustion would otherwise increase the CO2 contents of the flue gas released to the expander (3) and the atmosphere.

Figure 9:
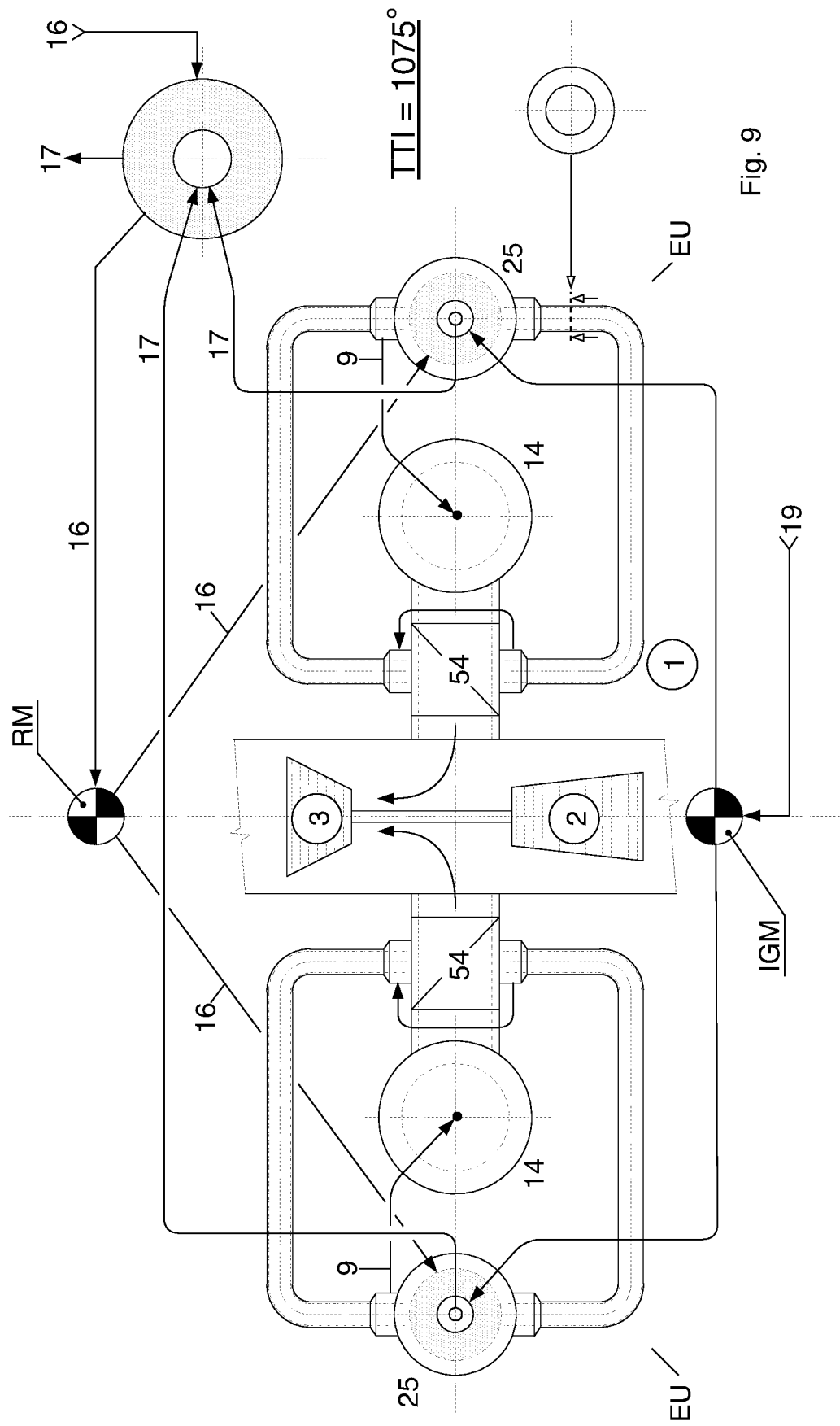

FIG. 9 Arrangement made for the Siemens V94.2 gas turbine. The advantage by using this turbine is the following; two external Combustion Chambers (14) are arranged with horizontal flue gas feed to the Expander (3)—allow for simple installation of the Flue Gas Directional Vane. The size of the two HTHE (25) is reduced. Distribution Drums are arranged for return flow line for flue gas (16) to the HTHS (25), and supply line from the High Pressure Air Compressor (19) to the Combustion Chambers (14). For said pipes the diameter, length and geometry are the same, with the effect of equal loads on the HTHE (25) and the same combustion conditions in the Combustion Chambers (14).

DESCRIPTION OF EMBODIMENTS OF THE INVENTION

The invention will in the following be described and embodiments of the invention will be explained with reference to the accompanying drawings. The embodiments described below and illustrated may be combined in various combinations by the person skilled in the art when first described herein.

Figure 1A:
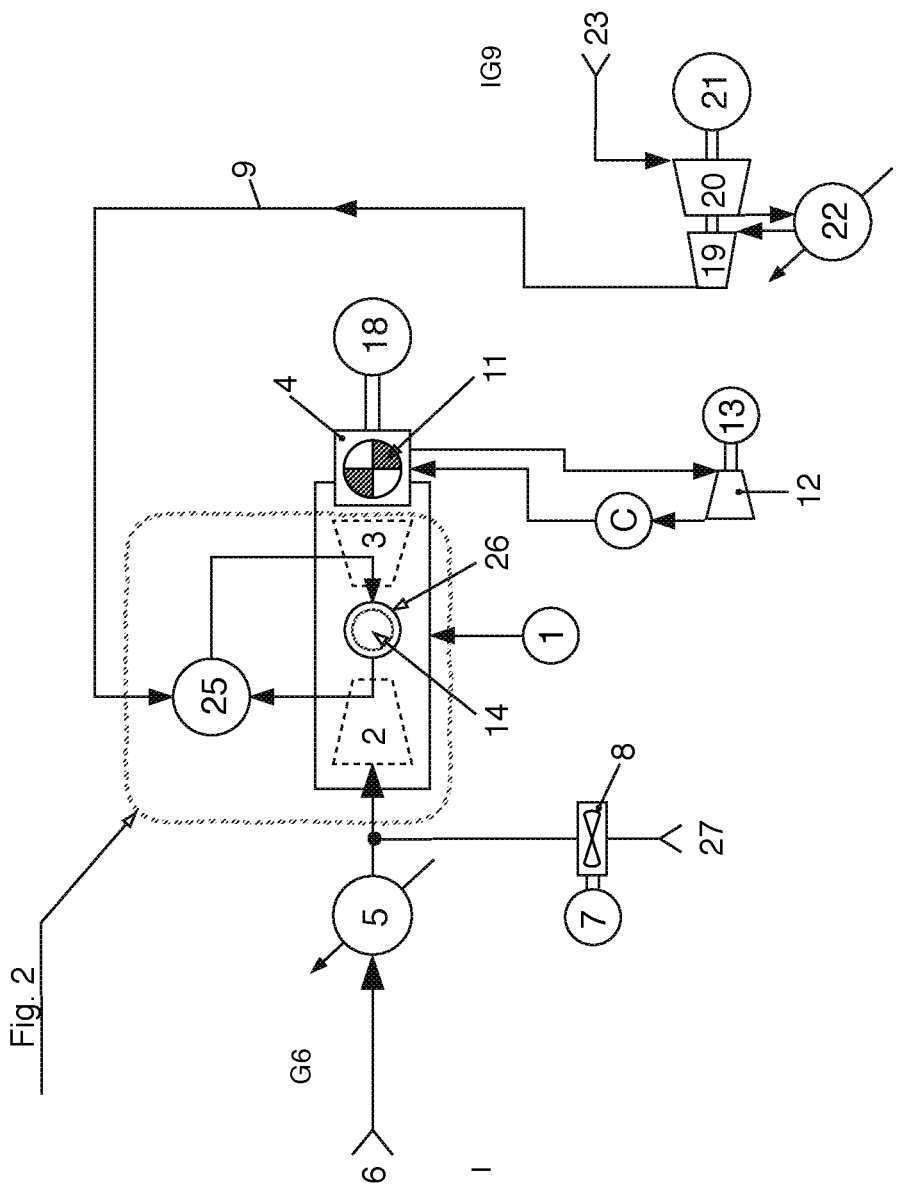

FIG. 1A illustrates a gas turbine (1) comprising an inlet line (6) for a CO2-containing initial flue gas flow (G6) to a compressor portion (2) of said gas turbine (1) for compressing said CO2-containing flue gas flow (G6). The compressor portion (2) has an outlet passage (1o) for compressed flue gas (G6), to a high-pressure combustion unit (26) with a HP combustion chamber (14) for said compressed flue gas (G6). Further details of the invention roughly illustrated in FIG. 1A are referred to in FIG. 1B and FIG. 2. FIG. 1A also illustrates an embodiment of the invention, there is aa cooler (5) arranged on the inlet line (6) for the CO2-containing initial flue gas flow (G6) to the compressor portion (2). Further details of FIG. 1A are given in the description of embodiments of the invention.

FIG. 1B illustrates further details of an embodiment of the invention shown in FIG. 1A. The pressure (HP) combustion chamber (14) of the combustion unit (26) is arranged for burning remaining Oxygen in said compressed flue gas (G6, 10) with a mixture of compressed air (IG9) supplied via a high pressure combustion air pipe (9) in a fuel feed line (10), preferably feeding gas fuel. The HP combustion unit (26) with said combustion chamber (14) is provided with a CO2-enriched flue pipe (15o) for hot, high pressure, high temperature, afterburned CO2-enriched flue gas (G6E) to a high pressure high temperature (HPHT) gas/gas heat exchanger (25), further delivering said cooled, CO2-rich flue gas (G6E) via a high-pressure medium temperature (HPMT) gas line (17) to a high pressure medium temperature (HPMT) heat exchanger (30A), having an outlet line (17, 30o) for said CO2-rich flue gas (G6E), to a high pressure CO2 capture plant (100), said CO2-capture plant (100) (Please see FIG. 4) eventually returning high pressure CO2-depleted flue gas (G6D) via a HP gas return line (16), and having an outlet line (42) for export of captured CO2. Please see further details of the carbon capture plant in FIG. 4.

Advantages of the modified CO2 capture gas turbine (1):
A combined gas turbine (1) with the diffusor/turbine portion (3) and the compressor portion (1) arranged in a compact, continuous housing (100) has a great advantage over prior art gas turbines with axially split compressor and diffusor/turbine portions on either sides of the outlet to/inlet from the afterburner chamber.

use of an off-the shelf combined compressor/diffusor turbine in a common housing (100) such as the GE GT11N2 turbine only slightly modified, makes it feasible to materialize the present invention using an off-the-shelf gas turbine housing which would otherwise require ten years of development. This will make it more realistic to contribute to avoid a given CO2 limit within the desired deadline internationally agreed on.

The temperatures in an embodiment of the power plant of the invention as illustrated in FIG. 1B has been estimated to be roughly as follows:

TABLE

Temperatures in essential components of the system of the invention

| Gas flow/component | T, deg. C. |
|---|---|
| CO2-enriched flue gas (G6E) at exit from combustion chamber (14) | 2000-1100 |
| CO2-enriched flue gas (G6E) in HPHT pipe (15o) when having been heat exchanged countercurrent with air (IG9) in coaxial duct (915o) about pipe (15o) | 1100 |
| Air (IG9) heat exchanged in cooling shell (915) of HTHP heat exchanger (25) and further heat exchanged in coaxial shell duct (915o) of HPHT pipe (15o) as above | 380 |
| Cooling Combustion Air (IG9) pipe (19) | 300 |
| Co-axial pipe (915) from (14) to (25), Cooling Combustion Air (IG9) temperature | 380 |
| Air (IG9) as above, further heat exchanged in coaxial shell duct (915R) of HPHT return pipe (15R), delivered to combustion chamber (14) | 400 |
| CO2-enriched flue gas (G6E) delivered through high pressure, medium temperature HPMT outlet pipe (17) from high-pressure high-temperature HPHT heat exchanger (25) to high-pressure medium temperature heat exchanger (30A). | 790 |
| CO2-enriched flue gas (G6E) heat exchanged through high pressure medium temperature heat exchanger (30A) delivered on line (17, 30o) (to SCR (29)) | 400 |
| Return temperature of CO2-depleted flue gas (G6D) returning from carbon capture plant (100) to high pressure medium temperature heat exchanger (30A) | 440 |
| Return temperature of CO2-depleted flue gas (G6D) returning from high pressure medium temperature heat exchanger (30A) on line (16) to HPHT heat exchanger (25) | 750 |
| Return temperature of heat exchanged CO2-depleted gas (G6D) after HPHT heat exchanger (25) to return pipe (15, 15R), (optionally further heated electrically) | 1260 |

Added Combustion Air

One may summarize some essential features of the new gas turbine carbon capture system as follows: Added combustion air (IG9) is added to the compressed flue gas (G6) in the combustion chamber (14) after the flue gas (G6) has been compressed by the compressor (2) in the turbine (1). The feed in added combustion air (IG9) is fed in by a separate compressor with intermediate cooling. The feed in air has several functions, as follows:

a) Cooling the pressure shell of the high pressure high temperature HTHP heat exchanger "HTHE" (25) This design allows to increase the return flue gas temperature up near the desired turbine inlet temperature (TIT) of the expander (3) so as for maintaining the energy conversion efficiency of the expander for which it is designed.

b) Cooling the pressure shell of the co-axial high temperature pipes (15); the CO2-enriched flue gas pipe (15, 15o) and the high-temperature CO2-depleted flue gas return pipe (15, 15R) between the HTHP heat exchanger (25) and the combustion chamber (14). This is necessary for a safe design with regard to material strength when basing the actual construction of the present invention using reasonably priced materials.

c) Compensating, together with the added fuel, for the CO2 captured volume removed from the absorber (33), so as for maintaining the turbine expander (3) efficiency without having to modify an existing expander (3) due to the modifications introduced by the present invention.

d) Delivering compressed air to the top of the combustion chamber via so-called primary burners (51) so as for increasing the entry temperature of the gas subject to downstream arranged burners (51d) relative to the primary burners in the combustion chamber (14). An advantage of this feature is that combustion can take place in a flue gas with low Oxygen content.

The high pressure (HP) return line (16) returning said HP CO2-depleted flue gas (G6D) back to the high pressure high temperature (HPHT) gas/gas heat exchanger (25) for heating the HP CO2-depleted flue gas (G6D). The then heated high-pressure CO2-depleted flue gas (G6D) is then led from the HPHT heat exchanger (25) through a flue gas return pipe (15r) delivering said heated HP CO2-depleted flue gas (G6D) to said expander portion (3) of said gas turbine (1).

Balanced Feed and CO2 Capture

If CO2 is removed by a CO2 capture plant/module (100), this would create a mass imbalance between the design of the expander (3) and the compressor (2), and would incur reduced power production or require modification of the turbine's expander (3). In an embodiment of the invention the supplied compressed air (IG9) supplied via the combustion air pipe (9) and the fuel fed through the fuel feed line (10), which will burn remaining Oxygen and form added CO2, will add an amount of gas in the CO2-enriched flue gas (G6E) corresponding to the amount of CO2 removed in the CO2-capture module (100), so as for balancing the amount of gas returned to the turbine's (1) expander portion (3). This is very advantageous because then the turbine's (1) expander (3) will be balanced relative to the compressor (2) according to the design criteria of the turbine (1) with its original combustion chamber (14) before modification by adding the HPHT heat exchanger (25) and the CO2 capture module (100). Thus we may modify existing gas turbines by adding the HPHT heat exchanger (25) and the CO2 capture module (100) without having to modify the turbine's expander (3). This will make gas turbines with external silo-type combustion chambers, presently CO2-producing gas turbines, available with minor for modifications to be integrated with high pressure CO2 capture plants and make them work with highly reduced CO2 emissions.

The Major Components

Figure 1C:
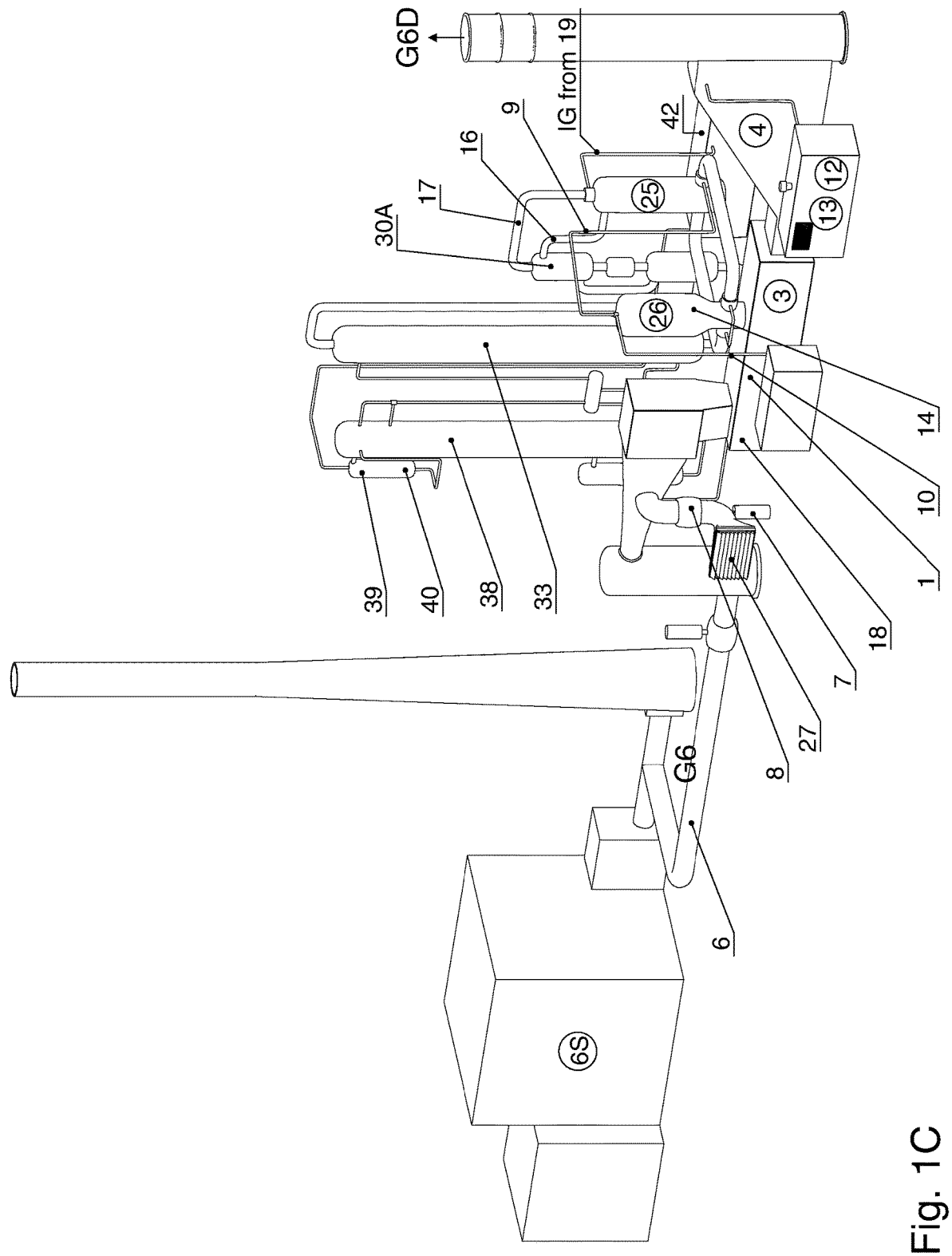

FIG. 1C is a perspective overview of an embodiment of the invention illustrating the larger components of the CO2 capture system with a gas turbine (1) being fed with flue gas flow (G6) from an inlet line (6) from a flue gas source (6S). The gas turbine (1) has an external combustion chamber (14) arranged in a combustion unit (26), for afterburning the flue gas with added fuel and compressed air (IG9). The external combustion chamber (14) is here mounted vertically on top of the horizontally arranged gas turbine (1). Instead of returning the afterburned flue gas, which is CO2-enriched, directly back to the gas turbine's (1) expander (3), the CO2-enriched flue gas (G6E) is sent via a gas flow adapter (54) out to a high pressure high temperature counterflow heat exchanger (25) having an outgoing high pressure CO2-enriched flue gas (G6E) outgoing line (17) and a corresponding high pressure lower temperature CO2-depleted flue gas (G6D) return line (16). Those two flue gas lines, the outgoing CO2-enriched flue gas line (17) and the CO2-depleted flue gas return line (16) are connected to a CO2-capture plant (Please see FIG. 4) arranged for being operated under high pressure. Main components of the CO2 capture plant (100) are a high pressure medium temperature heat exchanger (30A), a high pressure low temperature heat exchanger (30B), a condenser (31) and an absorber (33), further connected to a stripper (38) and eventually leading to the CO2 high pressure export pipeline (42). In an embodiment the CO2-plant (100) is based on a non-organic absorbent such as hot Potassium Carbonate (K2CO3), which has significant advantages when operated at high pressure such as 15 Bar. In this context, reference is made to the Benfield process, which has been in operation for more than 40 years.

Figure 1D:
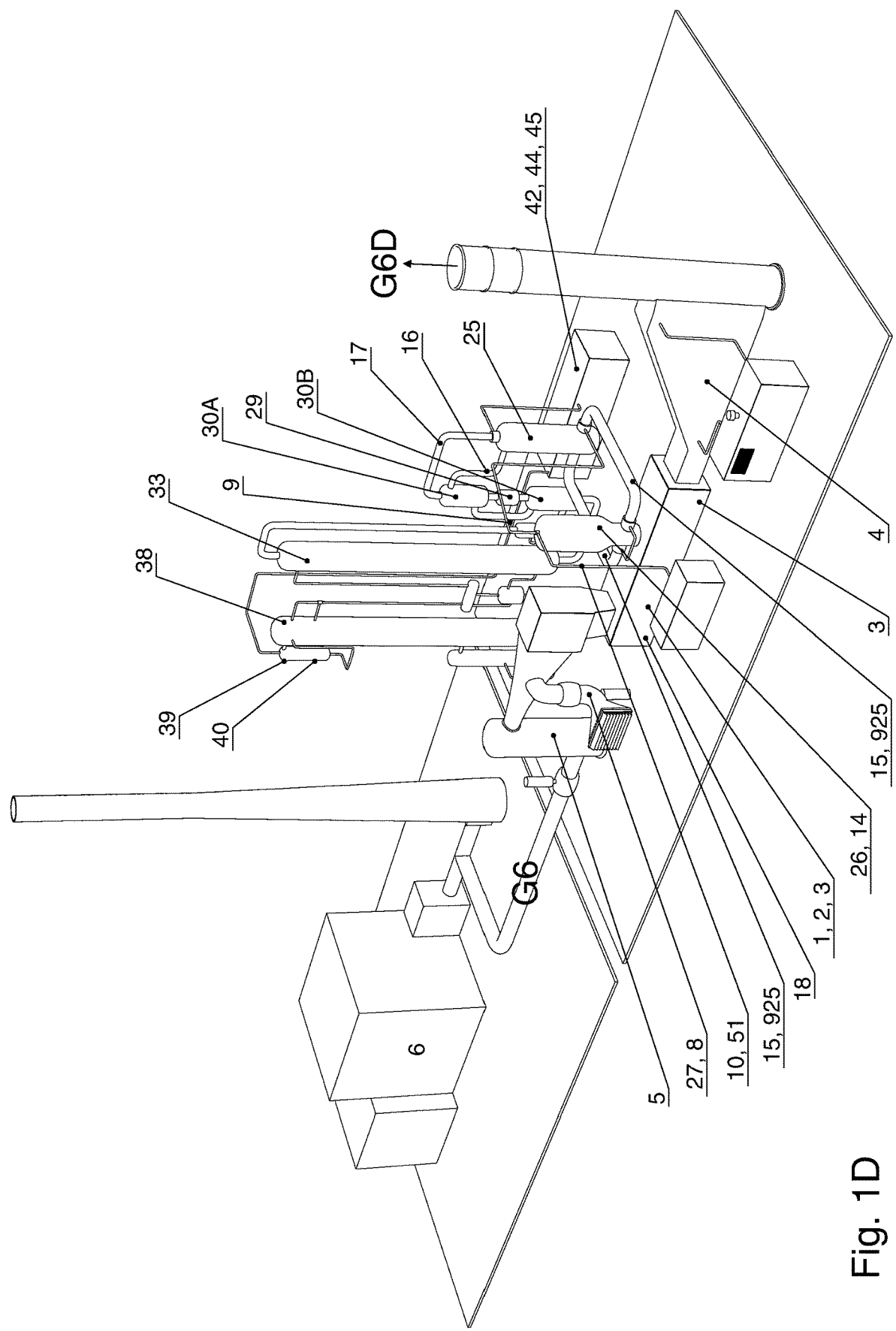

The embodiment of FIG. 1D utilizes components comparable to that of FIG. 1C.

Combustion to HPHT Heat Exchanger Loop

FIG. 2 shows in a top view further details of an embodiment of the gas turbine illustrated in FIG. 1A and FIG. 1B. In FIG. 2, it is illustrated an embodiment of the invention wherein the HP combustion chamber (14) of the combustion unit (26) is provided with fuel burners (51), preferably gas fuel burners (51), please also see details in FIG. 3, arranged for burning remaining Oxygen in said compressed flue gas (G6) with a mixture of the compressed air (IG9) supplied via the combustion air pipe (9) from an air compressor (19), and at least a fuel feed line (10), preferably feeding gas fuel. The HP combustion unit (26) with said chamber (14) is provided with the CO2-enriched flue pipe (15o) for hot, high-pressure (HPHT), after burned CO2-enriched flue gas (G6E) to the high pressure high temperature (HPHT) gas/gas heat exchanger (25), further delivering the CO2-rich flue gas (G6E) via the high-pressure medium temperature (HPMT) gas line (17) to the high pressure medium temperature (HPLT) heat exchanger (30A) having an outlet line (17, 30o) for said CO2-rich flue gas (G6E), to the high pressure low temperature heat exchanger (30B) and thereafter via the condenser (31) to the high pressure CO2 capture plant (100).

Compressed Flue Gas Cooling of Combustion Unit

The inflowing compressed air (G6) flows from the compressor (2) through the adapter (54) into the shell of the combustion unit (26) about the combustion chamber (14), please see FIG. 1B. In an embodiment the influx of compressed air and the initial burners (51) are near the top of the combustion unit (26) to a top aperture of the combustion chamber (14), and further fuel burners (51) may be arranged further into the combustion chamber (14) further increasing the combustion temperature. The combustion chamber is preferably provided with perforations allowing the inflowing flue gas (G6) to cool the walls of the combustion chamber while the combustion temperature resulting in the CO2-enriched flue gas (G6E) may be about 2000 degrees Celsius. This shield gas flow preserves the mechanical properties of the pressure shell, i.e. the combustion unit (26), and the structure of the combustion chamber (14). For details of the combustion chamber (14) please refer to the description of FIG. 3A-3.

Compressed Air Shell Cooling

In an embodiment the compressed air (IG9) delivered through the combustion and cooling air pipe (19) is used for counter flow cooling a cooling shell (925) of the HPHT heat exchanger (25). The cooling air is further connected from the HPTH heat exchanger (25) cooling shell (925) to a coaxial shell (915o) of the outgoing CO2-enriched flue gas pipe (15o). This will advantageously cool the walls of the high pressure high temperature heat exchanger (25) and the wall of the CO2-enriched flue pipe (15o) carrying the high pressure, high temperature flue gas (G6E) so as for cooling the steel of these components which are subject to high pressure and high temperature, maintaining the mechanical properties of the steel. This reduction in the material temperature tolerance requirements reduces the material costs and simplifies the construction of the modified turbine and carbon capture plant of the invention. In an embodiment of the invention this cooling air thus heated through the cooling shell (925) of the heat exchanger (25) and the annulus coaxial pipe shell (915o) of the flue gas pipe (15o) is eventually led as hot high pressure air (IG9) via said combustion air pipe (9) to the combustion chamber (14).

A significant advantage of this embodiment in addition to preserving the mechanical properties of the steel surrounding the outgoing, after burned, high pressure high temperature gas (G6E) is also that the temperature of the compressed air entering the combustion chamber is increased, thus facilitating the combustion.

FIG. 3 corresponds to the embodiment of the invention illustrated in FIG. 2 and illustrates in a lateral part section view, as a rough overview, the combustion unit (26) with the combustion chamber (14) and the HPHT heat exchanger (25). Here is shown the high pressure (HP) gas return line (16) for relatively cooler, high pressure CO2-depleted flue gas (G6D) from the carbon capture plant (100) back to the HPHT heat exchanger (25).

In this illustrated embodiment of the invention the high-pressure HP return line (16) returning said HP CO2-depleted flue gas (G6D) back to said HPHT gas/gas heat exchanger (25) for heating said HP CO2-depleted flue gas (G6D), and further connected to a flue gas return pipe (15r) delivering said heated HP CO2-depleted flue gas (G6D) to a return passage (1r) to said expander portion (3) of said gas turbine (1).

Symmetrical High Pressure High Temperature Pipes Embodiment

FIG. 3A-1 illustrates an embodiment of the invention. It is, in the left part of the sheet, a lateral view, part vertical section view of the combustion unit (26) with the combustion chamber (14) and its corresponding coaxial piping (15o, 915o) out for the CO2-enriched flue gas (G6E) to the high pressure high temperature heat exchanger (25) and return coaxial piping (15R, 915R) for CO2-enriched flue gas (G6D) returning from the CO2-capture plant (100) via the high pressure high temperature heat exchanger (25). An adapter (54) between the lateral outlet (1o) from the gas turbine's (1) compressor (2) to the cooling shell of the combustion chamber (14), and the return pipe (15R) to the lateral inlet (1R) to the gas turbine's (1) expander (3) is shown in vertical cross section.

In the right part of the sheet of FIG. 3A-1 is a lateral view and vertical section view of the high-pressure high temperature heat exchanger with the corresponding coaxial piping (15o, 915o) out and return coaxial piping (15R, 915R). In this embodiment, these main components are arranged as a symmetrical tank (14, 26) and pipe loop (15, 15o, 15R). In this embodiment it is shown a support structure for the high pressure high temperature heat exchanger (25) having a pivot bearing (59) on the supporting substrate (a floor etc.) allowing the heat exchanger (25) to pivot laterally in a direction to and from the mechanically vulnerable combustion unit (26), without incurring any significant bending moments to the adapter (54) between the gas turbine (1) and the combustion chamber (14). Such bending moments could be incurred by lateral displacement of the high pressure high temperature heat exchanger (25) given by temperature expansion in the connecting pipes (15, 15o, 15R).

In the middle portion of the sheet of FIG. 3A-1 is a detail of a directional dividing plate (55) in the inlet/outlet adapter (54). The dividing plate (55) may comprise high temperature heat resistant ceramic tiles (58) on a backing plate (57), the tiles in order to withstand the radiation heat from the gas burners (51, 51b) and temperature up to 2000 degrees Celsius, while the temperature of the flow of the hot after burned CO2-enriched gas flow (G6E) running from the exit of the combustion chamber (14) is about 1000 dgC.

FIG. 3A-2 corresponds to FIG. 3A-1 and is, in the left part of the sheet, a top view and partial section of the combustion unit (26) with the combustion chamber (14) and its corresponding coaxial piping (15o, 915o) out to the and return coaxial piping (15R, 915R). In the right part of the sheet is an end view and part vertical section view of the high-pressure high temperature heat exchanger with the corresponding coaxial piping (15o, 915o) to the HPHT heat exchanger (25).

FIG. 3A-3 illustrates further details in a vertical section of the combustion chamber (14). Air (IG9) heat exchanged in cooling shell (915) of HTHP heat exchanger (25) and further heat exchanged in coaxial shell duct (915o) of HPHT pipe (15o) is injected via the high pressure combustion air line (9) at the top of the combustion chamber (14). In this embodiment, natural gas burners (51) are arranged in the flow of compressed air (IG9) being mixed with flue gas (G6) entering from the cooling shell (926) around the combustion chamber (14). Every part of the gas streams must reach an adequately high temperature for a sufficient period of time, and there must be an adequate mixture of fuel and Oxygen. In this embodiment of the invention, in order to achieve an efficient combustion, the large combustion chamber (14) is designed in order to achieve this requirement. The temperature reached in the combustion chamber (14) is a result of heat released in the oxidation process and has to be maintained high enough in order to ensure that the combustion goes nearly completely to combustion. Turbulence is generated by flue gas nozzles (926i) leading in flue gas (G6) laterally from the cooling shell (925) into the combustion zone in the combustion chamber (14), in order to provide adequate contact between the combustible gases and Oxygen across the combustion chamber. In an embodiment of the invention, in order to increase the release of energy in the pressurized Oxygen, Methanol CH3OH is injected via secondary injection nozzles (51b) in the lower combustion zone of the combustion chamber (14). Methanol has an auto ignition temperature of 433+/−8 degrees Celsius.

Compressed flue gas (G6) originating from a coal fired power plant may be introduced to the combustion chamber (14). Such flue gas may contain Sulphur Oxides SOx which usually are controlled by costly wet or dry scrubbers. In an embodiment of the invention, SOx abetement may be obtained by injection of chemicals in the lower part of the combustion chamber (14) through injector nozzles (60) through which may be injected, Calcium Hydroxide Ca(OH)2, or Sodium Bicarbonate NaHCO3 with Nitrogen feed medium.

Figure 3B:
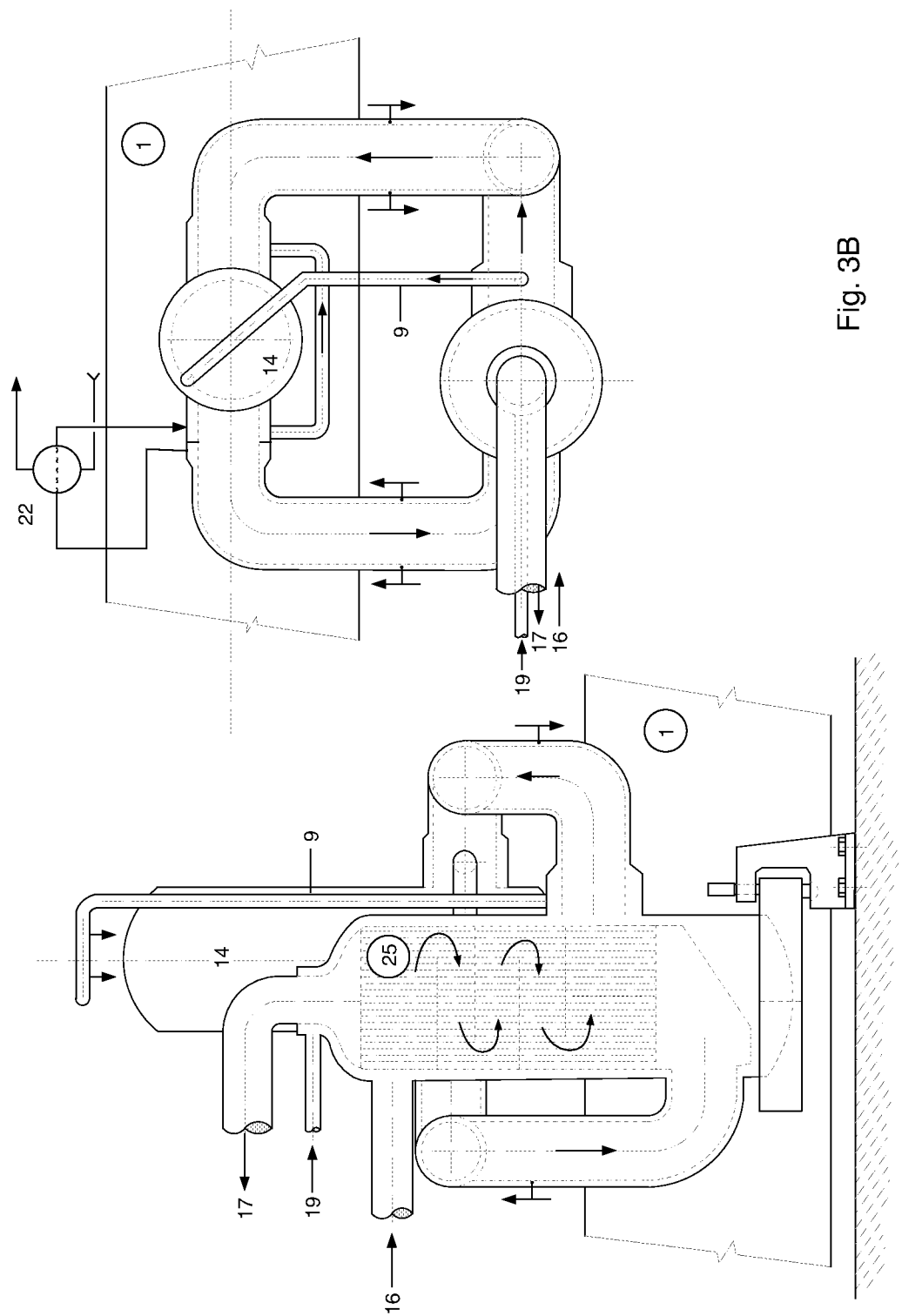
FIG. 3B is a lateral view and partial vertical section of an embodiment of the invention wherein the high pressure high temperature HPHT heat exchanger (25) is supported on a substrate which allows lateral movement as a result of thermal expansion and contraction.

FIG. 3B is a lateral view and partial vertical section of an embodiment of the invention wherein the high pressure high temperature HPHT heat exchanger (25) is supported on a substrate which allows lateral movement as a result of thermal expansion and contraction. Temperature variations in the combustion unit (26) tank and the high pressure high temperature heat exchanger (25) tank, especially during start-up of the turbine and plant, and also after halting, incurs is a risk of high lateral forces acting on the combustion chamber (14) on top of the gas turbine (1) as a result of temperature expansion of horizontally arranged coaxial pipes (15, 15o, 15R) between the combustion chamber (14) and the high pressure high temperature heat exchanger (25). Even in an embodiment with sliding bearing support of the heat exchanger (25) assuming a start friction coefficient of about 0.10, and assuming a total weight of 90 tonnes, the lateral forces generated can be undesirably high, about. 9 tons.

According to an embodiment of the invention, the piping (15, 15o, 15R) to and from the lower part of external Combustion Chamber (14) to the High Temperature Heat Exchanger HTHE (25) is a significant advantage for cooling the high pressure piping. In an embodiment of the invention the outer shell of the pipes is designed as pressure vessels operating up to 16 Bar or more), and having an operating temperature up to 350 degrees Celsius.

A solution to the initial friction problem is to arrange a distance measurement device such as a laser distance meter, on a plate on top of the combustion chamber (14) and exactly measure distance variations to the heat exchanger (25). Based on these distance variations, one may calculate the mutual forces between those vertical tank structures (25) and (26). Then an automatic screw-driven "tow back" actuator arrangement for the heat exchanger (25) may be arranged so as "tow-back" of the high pressure high temperature heat exchanger to a force-neutral position.

The same temperature expansion problem is solved in a simpler and a fail-safe way in the embodiment of the invention illustrated in FIGS. 3A-1 and FIG. 3A-2 in that the high temperature high pressure heat exchanger (25) is supported vertically on a pivoting support frame with a pivot self lubricating crystalized Graphite embedded bearing (59).

FIG. 4 is an illustration of the carbon capture plant portion of the invention. A "cloud" referring to FIG. 1B, FIG. 2, FIG. 3, FIG. 3A-1, FIG. 3A-2, FIG. 3A, with the supply line (17) of medium temperature high pressure HPMT CO2-enriched flue gas (G6E) and the return line (16) for CO2-depleted high pressure, low temperature flue gas (G6D) back to the high pressure medium temperature heat exchanger (30A), please see FIG. 1B.

FIG. 5 is a flow diagram for gas and energy in an embodiment of the present invention. Here we provide an example of relevant gas flows through the system according to the invention.

A flue gas (G6) gate valve (B) from e.g. a coal fired power plant (6) is closed during the normal operation of turbine (1); all the flue gas (G6) is directed into the gas turbine (1) of the present invention. The coal burning power plant may be a CO2-source (6) producing 250 MW.

A flue gas (G6) gate valve (A) is closed during start of the gas turbine (1), and is open during the normal operation of the gas turbine (1). The flue gas flow (G6) is about 333 kg/s and may have an oxygen content of 7%.

The gas turbine (1) of the invention has integrated CO2 capture and preferably NOx-capture, and generates 120 MW.

The coal fired power plant (6) generates 250 MW.

The combustion cooling air feed (IG9) is 45 kg/s to the combustion chamber (14), the Oxygen content in the flue gas mixed with air is 10.5%.

The supplementary air feed (27) may be 67 kg/s.

The CO2 export on CO2 export pipeline (42) is 5400 metric tonnes/day, with a CO2 capture rate of 95% and a power factor of 0.9.

In the embodiments shown in FIG. 1C, FIG. 1D, FIG. 2, FIG. 3, FIG. 3A1, FIG. 3A2, FIG. 3A3, FIG. 3B, said combustion unit (26) has a generally vertical orientation and it is arranged vertically above said turbine's (1) main horizontal axis.

We define generally that the combustion unit (26) and the heat exchanger (25) with the flue gas (G6E, G6D) lines (15, 15o, 15R) with their coaxial shell lines (915o, 915R), the compressed air (IG9) line (9), and fuel injection lines (10, 51b), and the HPMT CO2-enriched flue gas (G6E) line (17) and the CO2-depleted flue gas (G6D) line (16) are comprised in a CO2-enrichment unit (EU), please see FIGS. 1-3B.

In an embodiment of the invention the CO2 capture system comprises a second CO2 enrichment unit (EU') comprising a second combustion unit (26') and a second heat exchanger (25') with flue gas (G6E, G6D) second lines (15', 15o', 15R') with corresponding coaxial shell lines (915o', 915R'), compressed air (IG9) line (9'), and fuel injection lines (10', 51b'), and HPMT CO2-enriched flue gas (G6E) line (17') and CO2-depleted flue gas (G6D) line (16'). Please see FIG. 6 and FIG. 9.

In these embodiments, the gas lines (9', 915o', 915r', 15o', 15r', 17') and injection lines (10', 51b') arranged as a mirrored, equal and parallel to said CO2-enrichment unit (EU), and they are connected to parallelly arranged lateral flue gas outlets/inlets on the turbine's (1) casing.

Further to the above embodiment, the CO2 capture system according to the invention may have said return flue gas (G6D) line (16) arranged with a manifold (RM) to split of a second return line (16') for retuning a split flow portion of said HP-CO2-depleted flue gas (G6D) back to said heat exchanger (25'). In an embodiment of the invention the compressed air (IG9) is supplied via a manifold (IGM) to split off a compressed air (IG9) flow portion to said combustion air pipe (9').

In an embodiment of the invention, the CO2 capture system (100) according to the invention comprises a condenser (31) arranged between said heat exchangers (30A, 30B) and an absorber (33), please see FIG. 4, and a re-humidifier (32) in the return line between said absorber (33) and heat exchangers (30A, 30B). Further, a heat exchanger (35) is arranged between said absorber (33) and a stripper (38), and a booster pump (36) between said heat exchanger (35) and said absorber (33). A solvent expander turbine (37) is arranged between said heat exchanger (35) and said stripper (38). A re-boiler (47) is arranged for steam feed (48) to a vapour return pipe (46) to said stripper (38). A CO2-lean absorbent fluid pump (34) leads from said stripper (38) via said re-boiler (47) to said heat exchanger (35), and a condenser (39) for said CO2 captured from said stripper (38) leads to a CO2-separator (40) further connected to a compressor train (43) for CO2 to a CO2 export pipeline (42).

Temperature Expansion Compensation Embodiment

An annular space between the inner and outer co-axial pipes (15o, 915o, 15R, 915R) is cooled with combustion air (IG9).

With the pipes geometry developed and sliding support of HTHE, thermal stress from said Coaxial Pipes are neutralized, and will not impose forces on the new designed pipe adapter section (54) at the lower part of combustion chamber (14). Consequently additional thermal forces on the turbine's (1) casing are avoided.

According to an embodiment of the invention, sliding bearings (59) designed with self-adjustable disc spring support. The sliding material is self-lubricating inter crystallized graphite material. Sliding surfaces are made of high quality Stainless Steel with moderate hardness. Temperature expansion of the two horizontally arranged coaxial pipes between (14) and (25) will, if the foundation of (25) is fixed, generate a un-acceptable forces at the lower part of the combustion chamber followed by a lateral bending moment on the turbine casing. In order to neutralize said bending moment a sliding support was proposed. The bending moment was minimized by mechanical controlled displacement of (25) operated by input from distance measurement between (14) and (25).

We estimate the temperature expansion of the horizontally arranged coaxial pipes between (14) and (25) to be 1.51 inch (x), please see FIG. 3 A-1.

Input Parameters for the Calculation;
H Length of the co-axial pipes; 6.00 m/236 inch (both arranged in the same horizontal plane)
H Pipe material; Stainless Steel (18% Cr/8% Ni)
H Idle temperature; 70 degrees Fahrenheit
w Operating temperature; 600 dgF
H Expansion coefficient; 12.1 inch/inch dgF/10 exp6
(x) Compensation in terms of expansion caused by leakage of inner pipe; 4.5 inch/114 mm
Design features the new arrangement (FIG. 3 A-1 & FIG. 3 A-2)
h Flue gas feed and exit from (14) and (25) all arranged in the same horizontal plane.
Expansion of the two pipes arranged 90 dg to the turbine axis compensated by tilting of (25).
Expansion of the four pipe segments of parallel to the turbine axis will not generate forces on (14), nor the adapter section (54)

The invention is method and a plant for capturing CO2 from an incoming flue gas (G6). Said gas can be exhaust gas from coal and gas fired power plants, cement factories or refineries. The incoming exhaust gas is in an embodiment of the invention cooled, mixed with air and compressed in a compressor (2), and thereafter introduced into a combustion chamber (14) together with fuel gas and added compressed air (IG9). Part of the combustion is achieved by separate burners (51) with the cooling/combustion air (IG) feed with a combusted amount equal to the volume of CO2 captured. Said burners (51) will elevate the temperature in the combustion chamber (14) allowing combustion of flue gas (G6) with low oxygen content, producing CO2-enriched flue gas (G6E).

CO2 is captured at high pressure before expansion by the gas turbine's expander (3) to produce power. Optionally, the system may generate steam in a heat recovery unit (4). The gas turbine (1) will operate in a balanced mode with high efficiency close to design parameters with respect to inlet temperature, pressure and flow because there will be no mass or drive gas loss between the compressor (2) and the expander (3) due to the fact that added compressed air (IG9) and added fuel is burned to compensate for the CO2 gas mass removed in the CO2 capture plant/module (100).

The invention is a system solving above discussed problems and provides CO2 capture under high CO2 partial pressure will give the possibility to use cheap and environmentally friendly absorption chemicals as "Hot Potassium Carbonate" K2CO3. The gas turbine should be a gas turbine with one or two external combustion chambers and a high compressor pressure ratio. An example of such a turbines are Alstom GT11N2 and ABB GT13E1 gas turbines which may be arranged with a modified section (54) between the turbine (1) casing and the combustion chamber (14) design according to the invention, with exit (1o) to the CO2 capture absorber and return (1R) flow passages to the gas turbine (1) expander (3), connected to a high pressure heat exchanger and a Carbon capture section (100) according to the invention, will offer an efficient low cost solution for CO2 capture from flue gases with low oxygen content. The invention is thus applicable for retrofit use. The flue gas (G6) exit flow duct (1o) from the turbines compressor (2), and return flow duct (1R) for high temperature CO2 depleted flue gas (G6D) can be used without modifications, requiring an adapter (54) for the piping (15) and the combustion unit (26) with the combustion chamber (14). Turbine casing cooling and bearings for the gas turbine may thus be used unchanged if the present invention is used in a retrofit CO2 and NOx abatement from external sources of flue gases.

Main Design Strategy;
Flue gas flow (G6D) to the power turbine/expander (3) downstream the CO2 abatement capture unit should be of an amount close to the gas turbines (1) design parameters with respect to;
A. Design flow to the expander (3) achieved by introducing compressed air (IG9) and fuel for combustion equal to the volume of CO2 captured.
B. Temperature to the expander power turbine should preferably be as high as turbine inlet temperature (TIT) for the design load. The high TIT is obtained by using a high capacity high pressure high temperature heat exchanger (25). The shell (925) of the heat exchanger (25) is cooled by the high pressure combustion air (IG9) by feed from an air compressor (19/20), generally electrically driven. Co-axial exhaust feed and exit lines (15, 15o, 15R) to and from the high temperature heat exchanger (25) are also cooled with said combustion air from the compressor (19/20)
C. Pressure drop of the flue gas is small due to the low velocity in the absorber (33) and the heat exchangers (25, 30A, 30B). The pressure drop (abt. 0.5 Bar) is compensated by a fan upstream the absorber (33). In the present invention, the energy needed for flue gas (G6) compression and driving the generator (18) is generated by the flue gas expansion turbine (3).
D. In an embodiment of the invention, steam generated by the flue gas heat recovery unit (4) is delivered to a steam turbine generator and Stripper Reboiler (47)
E. In an embodiment of the invention, coolers 5, 22 (FIG. 1B), and 45 will operate as economizers for steam production Comparing two systems, the first (alt. A) with the turbines compressor pressure ratio being 15.5:1 and having an exhaust gas flow of 400 Kg/sec, with a second one (alt. B) having a pressure upstream Boiler and absorber abatement at 8.0 Bar with an exhaust gas flow of 220 Kg/s, the cost reduction ratio of CO2 capture alternative A compared with alternative B is 8.0/15.1=0.53. moreover, the CO2 capture efficiency will increase with elevated pressure.

Examples of flue gas (G6) flow oxygen content to combustion chamber from different sources (6):

| | | MW | Kg/sec | O2 (%) | CO2(%) | +Air Kg/sec | O2(%) |
|---|---|---|---|---|---|---|---|
| 1 | Coal fired module | 300 | 350 | 6 | 12 | 92 | 9.1 |

-continued

|   |                  | MW  | Kg/sec | O2 (%) | CO2(%) | +Air Kg/sec | O2(%) |
|---|------------------|-----|--------|--------|--------|-------------|-------|
| 2 | Gas fired module | 200 | 350    | 13     | 4      | 50          | 14.0  |
| 3 | Refinery cracker | —   | 150    | 4      | 13     | 250         | 18.3  |

Remarks;
1. Typical coal fired module 600 MW, CO2 capture from two trains. Air feed to shell cooling and thereafter to combustion chamber burners; 48 Kg/sec
2. Air feed to shell cooling and thereafter to combustion chamber burners; 16 Kg/sec
3. Air feed to shell cooling and thereafter to combustion chamber burners; 20 Kg/sec Typical weight of the HTHE (25) about 90 tons installed for a Gas turbine combined cycle power plant of 170 MW The invention may be described as follows, and using the inventors' own words, the invention is a method for capturing CO2 from a flue exhaust gas (G6), comprising the steps of;
a. Cooling the incoming flue gas (G6)
b. Blending the incoming the incoming exhaust gas with air
c. Compressing the exhaust gas/air mix by use of a gas turbine compressor (2) and conducting the compressed gas (G6) into one or two large external silo-type combustion chamber (14).
d. Adding of fuel and the incoming exhaust gas (G6) mixed with compressed air (IG9) into the combustion chamber (14) to allow combustion of most of the rest oxygen in the flue gas (G6)
e. Introduction of additional combustion air to fuel gas burners (51) in the combustion chamber (14)
f. Allowing the added combustion air/fuel for combustion with an amount to equal to the amount of CO2 captured
g. Preferably, the compressed combustion air (IG9) is delivered by an electrically driven compressor with inter cooling
h. The initial delivered temperature of the compressed combustion air (IG9) is preferably below 300 dgC to allow efficient cooling.
i. The compressed combustion air (IG9) is used for cooling of the following items; coaxial pipes (15) to (15o) and from (15R) a high pressure high temperature heat exchanger (25) and shell (925) of said heat exchanger
j. Introducing the resulting exhaust gas (G6E) into a carbon capture unit (100) for separation of the resulting exhaust gas into a CO2 stream that is compressed and exported (42) from the plant, and a CO2 depleted stream (G6D).
k. Expanding the CO2 depleted stream (G6D) in the gas turbine's (1) expander turbine (3) for drive of the gas turbine compressor (2), to produce electrical power by a generator (18), and releasing the expanded CO2 depleted gas to a heat recovery unit (4) and thereafter to the surroundings.
l. Optionally Introducing an electrically driven exhaust fan upstream the absorber in order to compensate for the pressure drop in the heat exchangers and the absorber.

Details of the System:
a. Cooling incoming flue gas and mix said gas with air before feed to the gas turbine compressor.
b. Feed of flue gas air mix to the gas turbines large external combustion chamber.
c. Burners in the combustion chamber designed for burning fuel mixed with air and fuel injection nozzles.
d. The burners with direct air feed will increase the flue gas temperature in the lower part of the combustion chamber. With elevated temperature fuel gas can be injected for nearly full combustion with the rest Oxygen in the combustion chamber
e. The external shell and the inner shell of the combustion chamber is cooled with flue gas air mix downstream the compressor.
f. Openings in the inner shell of the combustion chamber will by-pass the combustion for control of the exit temperature, feed to the high temperature heat exchanger.
g. Flue gas exit is led by a co-axial pipe to the high temperature heat exchanger
h. The co-axial pipe is cooled by counter flow of combustion air
i. The combustion air is led by separate pipes to ⅕ of the combustion chamber burners.
j. Hot flue gas exit from the high temperature heat exchanger to the expansion turbine is through a co-axial pipe cooled with combustion air.
k. Said air is also cooling the high temperature heat exchanger shell.
l. Before cooling the co-axial pipe under item (e), the air temperature is lowered by a compressor inter-cooler (22) to achieve an exit temperature of the compressed air (IG9) below 350 dgC
m. Flue gas with a temperature of abt. 400 dgC is led to scrubber (SCR) (29) for Nox capture and thereafter to a low temperature heat exchanger (30B) and a condenser (31) in order to minimize the buildup of water in the absorber absorption fluid.
n. Condensed water is pumped from the condenser (31) over to the re-humidifier (32) in order to feed the condensation energy back into the CO2-depleted flue gas (G6D).
o. A flue gas fan is arranged upstream the absorber in order to compensate for the pressure drop in the pipes, heat exchangers and the absorber.
p. The CO2 depleted flue gas from the absorber is directed through the re-humidifier (32) to the low temperature heat exchanger, medium temperature heat exchanger, high temperature heat exchanger and thereafter to the expansion turbine.
q. An electrically driven air compressor with intercooling will deliver cooling and combustion air. The volume of the air will be equal to the volume of CO2 captured
r. The above described design will secure that the gas turbine will operate close to design parameters with respect to, flue gas volume, temperature and pressure.
s. The absorption fluid is circulated between the high pressure absorber and the Stripper operating at atmospheric pressure.
t. The High pressure absorbent fluid (K2CO3 mixed with H2O) is expanded by a turbine which is drive for a booster fluid pump arranged on the same shaft.
u. Heat recovered after expansion of the flue gas is used for steam production
v. Said steam is used by a Steam turbine and the Stripper's Reboiler.
w. Heat generated by the coolers and CO2 compressor train is feed to economizers upstream the HRU (4).
x. The absorber will operate at a pressure of abt. 15 Bar in compliance with CO2 capture modules for a large number of chemical plants (Ref. Benfield Process)

COMPONENTS LIST

| | |
|---|---|
| 1. Gas turbine with one external combustion chamber | 2. Compressor |
| 3. Expander (turbine) | 4. Flue gas heat recovery unit (HRSG) |
| 5. Flue gas cooler | 6. Flue gas from fossil fueled power plant or refinery cracker |
| 7. El-motor | 8. Air fan |
| 9. Combustion and cooling air pipe | 10. Natural gas feed |
| 11. Methanol/NG feed to supplementary fired burners | 12. Steam turbine (feed (4) HRSG) |
| 13. Electric generator drive (12) | 14. Combustion chamber |
| 15, 15o, 915o 15R, 915R. Flue gas coaxial pipe cooled with combustion air IG9 | 16. Flue gas without CO2 delivered from medium temperature heat exchanger. |
| 17. Flue gas with C02 delivered to low temperature heat exchanger (30A) | 18. Electric generator |
| 19. High pressure air compressor for delivering compressed air IG9 | 20. Low pressure air compressor |
| 21. Electric motor driving air compressors | 22. Air cooler |
| 23. Cooling and combustion air intake | 24. Cooling and combustion air jumper pipe |
| 25. High temperature heat exchanger | 26. Combustion unit |
| 27. Supplementary air feed | 28. Feed NH3 (liquid) |
| 29. Selective Catalytic Reduction (SCR) for Nox capture | 30A. Medium temperature heat exchanger. |
| | 30B. Low temperature heat exchanger. |
| 31. Condenser | 32. Re-humidifier |
| 33. Absorber (pressure; 15 Bar) | 34. Pump for lean absorbent fluid (Potassium Carbonate mixes with water) |
| 35. Heat exchanger | 36. Booster pump |
| 37. Solvent expander turbine | 38. Stripper |
| 39. Condenser | 40. CO2 Separator |
| 41. CO2 pipeline 1 Bar | 42. CO2 export pipeline 120 Bar (liquid) |
| 43. CO2 compressor train | 44. Electric motor |
| 45. Coolers | 46. Vapor return pipe |
| 47. Reboiler | 48. Steam feed |
| 49. Lean absorbent fluid (1 Bar) | 50. Ritch absorbent fluid (abt. 15 Bar) |
| 51. Burners for Natural Gas, CO or Refinery Gas | 52. Counter weight (Cast Iron) |
| 53. Insulated support for vertical load (Coaxial pipe (15) free to move horizontally) | 54. New gas turbine section comprising Feed from combustion chamber (14) to High temperature heat exchanger (25) and return flow from (25) to expander (3) |
| Feed of flue gas from Combustion chamber (14) to and from High temperature heat | exchanger (25) and return flow to Gas turbine (1) expander (3) |
| 55. Flue gas directional vane plate arranged in the new turbine section (54). | 56. Support frame on directional vane plate (55, 57) to hold heat resistant tiles. |
| 57. Flue gas directional vane base plate (55), preferably in Titanium | 58. Heat resistant tiles. |
| 59. Floor support bearing for HPHT heat exchanger 25 | (x) Required; Radiation heat from burners abt. 2000 dg C. 60 injectors for chemical such as Ca(OH)2 Calcium Hydroxide or NaHCO3 Sodium Bicarbonate |
| 100: CO2 capture plant in general | |
| 925: cooling shell annulus for cooling and combustion air of HPHT heat exchanger | |

The invention claimed is:

1. A CO2 capture system with a gas turbine, comprising:

an inlet line arranged downstream of a CO2-rich flue gas source and conveying a CO2-containing initial flue gas flow to a compressor portion of said gas turbine for compressing said initial CO2-containing flue gas flow to a first pressure and a first temperature;

said compressor portion having a casing outlet passage for compressed flue gas that is coupled to a pressurized combustion unit operating at the first pressure and utilizing a pressurized combustion chamber for said compressed flue gas;

said pressurized combustion chamber utilizing gas burners configured for burning remaining oxygen in said compressed flue gas with a mixture of compressed air supplied via a combustion air pipe and fuel supplied via a fuel feed line;

said pressurized combustion unit with said pressurized combustion chamber being coupled, via a CO2-enriched flue gas pipe for resulting hot, afterburned pressurized CO2-enriched flue gas that has a second temperature higher than said first temperature, to a HPHT gas/gas heat exchanger operating at said first pressure;

said CO2-enriched flue gas being conveyed, via a HPMT gas line and while operating at a third temperature lower than said second temperature, to a CO2 capture plant comprising a HP gas return line operating at a fourth temperature lower than said third temperature with said HP gas return line conveying pressurized CO2-depleted flue gas back to said HPHT gas/gas heat exchanger;

an outlet line of said CO2 capture plant being configured to export captured CO2;

said HP gas return line returning said pressurized CO2-depleted flue gas back to said HPHT gas/gas heat exchanger for heating said CO2-depleted flue gas to a fifth higher temperature;

said HPHT gas/gas heat exchanger being further connected to, via a flue gas return pipe that delivers said CO2-depleted flue gas to a return passage, an expander portion running said gas turbine;

a gas flow adapter arranged between a casing of said gas turbine and said pressurized combustion unit, said gas flow adapter being arranged between a coaxial peripheral outlet passage utilized for said compressed flue gas and a central return passage utilized for said CO2-depleted flue gas on one side;

a coaxial peripheral shell inlet being utilized for conveying said compressed flue gas to a shell of said pressurized combustion unit about said external combustion chamber and a central combustion return passage of said combustion chamber being utilized for afterburned, pressurized CO2-enriched flue gas on an other side; and a gas flow deviation plate arranged between said central combustion return passage utilized for said CO2-depleted flue gas on the one side and said central combustion return passage on the other side, said gas flow deviation plate having a first face leading from said central combustion return passage to said CO2-enriched flue gas pipe and an opposite face leading from a second, opposite lateral direction from said coaxial return pipe for said CO2-depleted flue gas from said HPHT gas/gas heat exchanger to said central return passage to said expander portion.

2. The system of claim 1, further comprising a HPLT heat exchanger coupled to said HPMT gas line and to said HP gas return line.

3. The system of claim 1, further comprising a HPMT heat exchanger coupled to said HPMT gas line and said HP gas return line.

4. The system of claim 1, wherein said HPHT gas/gas heat exchanger comprises a cooling shell configured to heat said compressed air.

5. The system of claim 1, wherein said CO2-enriched flue gas pipe and said flue gas return pipe are coaxial pipes each with coaxial annulus pipe portions.

6. The system of claim 1, wherein the system is configured such that an amount of said compressed air and a mass of fuel supplied to said pressurized combustion chamber corresponds to an amount of captured CO2 removed from said flue gas flow in said CO2 capture plant, thereby balancing a total flue gas flow through said compressor portion with said CO2-depleted flue gas flow through said expander portion of said gas turbine.

7. The system of claim 1, wherein said gas burners are natural gas burners supplied with natural gas.

8. The system of claim 5, further comprising a bypass line coupling one coaxial annulus pipe portion to another coaxial annulus pipe portion in order to create a continuous compressed air cooling path.

9. The system of claim 8, wherein said CO2-enriched flue gas pipe has a same length as said flue gas return pipe between said pressurized combustion chamber and said HPHT gas/gas heat exchanger, as projected into a horizontal plane.

10. The system of claim 1, wherein the capture system comprises an absorber that employs a CO2 absorber medium that is Potassium Carbonate ($K_2CO_3$).

11. The system of claim 1, further comprising a flue gas cooler and an air supply feed arranged upstream of the compressor portion.

12. The system of claim 1, further comprising methanol injection lines arranged into downstream portions of said pressurized combustion chamber, wherein said gas burners are arranged near a top of said pressurized combustion chamber.

13. The system of claim 1, further comprising flue gas nozzles configured to feed flue gas laterally so as to provide mixing contact between the fuel and Oxygen across a lower part of the pressurized combustion chamber.

14. The system of claim 1, wherein:
said casing outlet passage and said return passage are arranged co-axially in a vertical direction relative to a common axis on the compressor portion and the expander portion; and
said pressurized combustion chamber being an axially oriented vertical combustion chamber.

15. The system of claim 14, further comprising coaxially arranged outgoing and return pipes and forming a rectangular loop with rounded corners.

16. The system of claim 1, wherein said combustion unit has a vertical orientation and is arranged vertically above a main horizontal axis of said gas turbine.

17. The system of claim 1, wherein said CO2 capture plant comprises:
a condenser coupled with a high pressure medium temperature heat exchanger arranged in series with a high pressure low temperature heat exchanger and an absorber;
a re-humidifier in a return line between said absorber and said high pressure medium temperature heat exchanger;
another heat exchanger arranged between said absorber and a stripper; and
a booster pump arranged between said another heat exchanger and said absorber;
a solvent expander turbine arranged between said another heat exchanger and said stripper;
a re-boiler;
a CO2-lean absorbent fluid pump coupled to said stripper; and
a CO2-separator.

18. The system of claim 17, wherein the CO2-enriched flue gas having reached a temperature of 400 degrees C. is led to selective catalytic reduction (SCR) for NOx capture.

19. The system of claim 17, further comprising a re-humidifier arranged between the absorber and the high pressure medium temperature heat exchanger.

20. A method for capturing CO2 from an incoming exhaust gas, the method comprising:
a. cooling the incoming exhaust gas in a cooler;
b. blending the incoming exhaust gas with air;
c. compressing the blended incoming exhaust gas/air utilizing a compressor of a gas turbine and at least one external combustion unit having a combustion chamber;
d. introducing fuel and the incoming exhaust gas mixed with air into the combustion chamber to provide combustion in flue gas with a low Oxygen content;
e. introducing compressed combustion air to fuel gas burners of said combustion chamber;
f. introducing a resulting exhaust gas into a CO2 capture plant for separation of the resulting exhaust gas into a CO2 stream that is compressed and exported from the CO2 capture plant and a CO2 depleted gas stream on an export line; and
g. expanding, in an expander portion, the CO2 depleted gas stream in driving the compressor of the gas turbine to produce electrical power in a generator and releasing the expanded CO2 depleted gas in order to recover heat in a heat recovery unit and thereafter to releasing the expanded CO2 depleted gas to atmosphere,
wherein, in stage (e), an amount of said compressed combustion air is equal to an amount of CO2 captured in a CO2 capture plant, said compressed combustion air is delivered by an electrically driven compressor with inter cooling,
wherein a temperature of the compressed combustion/cooling air delivered by a pipeline directly from said electrically driven compressor to a top of a HPHT heat exchanger will be below 300 degrees C., and
wherein the compressed combustion air is used for cooling of coaxial pipes to and from said HPHT heat exchanger and a shell of said HPHT heat exchanger.

21. The method of claim 20, further comprising arranging a gas flow adapter between a coaxial peripheral outlet passage and a central return passage.

22. The method of claim 21, further comprising:
arranging a shell of said combustion unit about said external combustion chamber having a central combustion return passage for afterburned, CO2-enriched flue gas; and arranging a gas flow deviation plate between said central return passage and said central combustion return passage,
wherein said gas flow deviation plate comprises:
a first face interposed between said central combustion return passage and a said coaxial pipe conveying afterburned CO2-enriched flue gas, and
an opposite second face.

23. The method of claim 20, wherein the gas turbine further comprises:
an inlet line from a CO2-enriched flue gas source;
a casing outlet passage;
gas burners;
a HPMT gas line coupled to the CO2 capture plant comprising a HP gas return line and an outlet line for exporting captured CO2; and
said HPHT heat exchanger being connected via a flue gas return pipe to an expander portion of said gas turbine.

* * * * *